US006597668B1

(12) United States Patent
Schafer et al.

(10) Patent No.: US 6,597,668 B1
(45) Date of Patent: Jul. 22, 2003

(54) SYSTEM AND METHOD FOR MAXIMIZING EFFICIENCY IN A TIME DIVISION DUPLEX SYSTEM EMPLOYING DYNAMIC ASYMMETRY

(75) Inventors: David C. Schafer, South Bend, IN (US); Robert B. Foster, Bellevue, WA (US); M. Sue McMeekin, Nederland, CO (US)

(73) Assignee: Harris Broadband Wireless Access, Inc., Bellevue, WA (US)

( * ) Notice: Subject to any disclaimer, the term of this patent is extended or adjusted under 35 U.S.C. 154(b) by 94 days.

(21) Appl. No.: 09/604,437

(22) Filed: Jun. 27, 2000

Related U.S. Application Data

(60) Continuation-in-part of application No. 09/434,832, filed on Nov. 5, 1999, which is a division of application No. 08/740,332, filed on Nov. 7, 1996, now Pat. No. 6,016,313.

(51) Int. Cl.[7] .............................. H04J 3/00; H04Q 7/20

(52) U.S. Cl. ....................... 370/280; 370/252; 455/450

(58) Field of Search ................................ 370/229, 230, 370/235, 252, 280, 281, 294, 295, 321; 375/326, 346, 348, 349, 240; 455/450, 464

(56) References Cited

U.S. PATENT DOCUMENTS

| | | | | | |
|---|---|---|---|---|---|
| 5,164,938 | A | * | 11/1992 | Jurkevich et al. | 370/60 |
| 5,291,481 | A | * | 3/1994 | Doshi et al. | 370/60 |
| 5,392,280 | A | * | 2/1995 | Zheng | 370/60 |
| 5,734,678 | A | * | 3/1998 | Paneth et al. | 375/240 |
| 5,768,254 | A | | 6/1998 | Papadopoulos et al. | 370/201 |
| 5,892,796 | A | * | 4/1999 | Rypinski | 375/232 |
| 5,956,642 | A | * | 9/1999 | Larsson et al. | 455/449 |
| 5,963,548 | A | * | 10/1999 | Virtanen | 370/335 |
| 6,016,311 | A | | 1/2000 | Gilbert et al. | 370/280 |
| 6,016,313 | A | * | 1/2000 | Foster, Jr. et al. | 370/330 |
| 6,081,559 | A | * | 6/2000 | Leclerc et al. | 375/326 |

* cited by examiner

Primary Examiner—Alpus H. Hsu
Assistant Examiner—Toan Nguyen
(74) Attorney, Agent, or Firm—Duane Morris LLP

(57) ABSTRACT

Systems and methods for efficiently utilizing spectrum in a time division duplex system are shown. In the preferred embodiment fractions of a time division duplex frame are asymmetrically adjusted as forward and reverse channels according to communication demands/requests. Particular groups of resources for which independent asynchronous operation would result in undesired consequences are preferably operated in lockstep to thereby avoid the undesired consequences. Accordingly, a most preferred embodiment of the present invention provides for lockstep asymmetric adaptive time division duplexing among multiple carriers of a hub and multiple node wireless communication system.

74 Claims, 10 Drawing Sheets

SYSTEM AND METHOD FOR MAXIMIZING EFFICIENCY IN A TIME DIVISION DUPLEX SYSTEM EMPLOYING DYNAMIC ASYMMETRY

RELATED APPLICATIONS

The present application is a continuation-in-part application of commonly assigned, U.S. patent application Ser. No. 09/434,832, entitled "System and Method for Broadband Millimeter Wave Data Communication" filed Nov. 5, 1999, which itself is a divisional of commonly assigned, U.S. patent application Ser. No. 08/740,332 now U.S. Pat. No. 6,016,313 entitled "System and Method for Broadband Millimeter Wave Data Communication" filed Nov. 7, 1996, now U.S. Pat. No. 6,016,313, the disclosures of which are incorporated herein by reference.

The present application is also related to commonly assigned, U.S. patent application Ser. No. 09/327,787 now U.S. Pat. No. 6,404,755 entitled "Multi-Level Information Mapping System and Method" filed Jun. 7, 1999, the disclosure of which is incorporated herein by reference.

TECHNICAL FIELD OF THE INVENTION

This invention relates to communication systems and methods and more particularly to a system and method which provides for broadband information communication between processor-based systems through a centralized communication array using adaptive time division duplexing.

BACKGROUND OF THE INVENTION

In the past, information communication between processor-based systems, such as local area networks (LAN) and other general purpose computers, separated by significant physical distances has been an obstacle to integration of such systems. The choices available to bridge the physical gap between such systems have not only been limited, but have required undesirable tradeoffs in cost, performance, and reliability.

One group of historically available communication choices includes such solutions as the utilization of a standard public switch telephone network (PSTN) or multiplexing signals over an existing physical link to bridge the gap and provide information communication between the systems. Although such solutions are typically inexpensive to implement, they include numerous undesirable traits. Specifically, since these existing links are typically not designed for high speed data communication, they lack the bandwidth through which to communicate large amounts of data rapidly. As in-building LAN speeds increase to 100 Mbps, the local PSTN voice grade circuits even more markedly represent a choke point for broadband metropolitan area access and therefore are becoming a less and less desirable alternative. Furthermore, such connections lack the fault tolerance or reliability found in systems designed for reliable transmission of important processor-based system information.

Another historically available group of communication choices is found at the opposite end of the price spectrum than those mentioned above. This group includes such solutions as the utilization of a fibre optic ring or point to point microwave communication. These solutions are typically cost prohibitive for all but the larger users. The point to point systems require a dedicated system at each end of the communication link which lacks the ability to spread the cost of such systems over a plurality of users. Even if these systems were modifiable to be point-to-multipoint, to realize the economy of multiple system use of some system elements, the present point-to-point microwave systems would not provide broadband data services but rather traditional bearer services such as T1 and DS3. Furthermore these systems typically provide a proprietary interface and therefore do not lend themselves to simple interfacing with a variety of general purpose processor-based systems.

Although a fibre optic ring provides economy if utilized by a plurality of systems, it must be physically coupled to such systems. As the cost of purchasing, placing, and maintaining such a ring is great, even the economy of multi-system utilization generally does not overcome the prohibitive cost of implementation.

A need therefore exists in the art of information communication for a communication system providing cost effective bridging of large physical distances between processor-based systems.

A further need exists in the art for a communication system providing high speed broadband information communication between processor-based systems.

A still further need exists in the art for a communication system and a method of operation which efficiently utilizes the available spectrum in order to provide optimized information throughput.

A need also exists in the art for a fault tolerant communication system providing reliable bridging of physical gaps between processor-based systems.

Additionally, a need exists in the art for a broadband communication system providing simple connectivity to a variety of processor-based systems and communication protocols, including general purpose computer systems and their standard communication protocols.

SUMMARY OF THE INVENTION

These and other objects, needs and desires are achieved by a system and method of communication in which a communication array (referred to herein as a hub), is centrally located to provide an air link to a plurality of physically separated subscriber processor-based systems, or other sources of communication such as voice communication, utilizing a communication device (referred to herein as a node, which together with the subscriber processor-based system is referred to herein as a remote system or subscriber system) of the present invention. Preferably, this central array may be physically coupled to an information communication backbone providing communication between air linked systems and physically linked systems. Furthermore, multiple ones of such system may be utilized to bridge large physical separation of systems by the intercommunication of multiple central arrays. Moreover, pervasive surface coverage may be provided by arranging a plurality of such communication arrays to provide a cellular like overlay pattern.

In a preferred embodiment, the communication spectrum utilized by the communication system is frequency division multiplexed (FDM) to provide multiple channels or carriers for simultaneous information communication to a plurality of subscribers. Moreover, a preferred embodiment subscriber system is adapted to be dynamically controllable to select between ones of the FDM carriers utilized by the communication system.

Preferably a carrier frequency in the millimeter wavelength (MM Wave) spectrum, such as 10 to 60 GHz, is used by the present invention. Such carrier frequencies are desirable in order to provide a communication bandwidth sufficient for the transmission of at least 30 Mbps through each defined FDM channel of approximately 10 MHz. However, it shall be appreciated that the concepts of the present invention are applicable to portions of the spectrum other than millimeter wavelengths. For example, the present invention is particularly well suited for use in lower frequency bands, such as those in the 300 MHz to 3 GHz range, where radiation of signals are not as confined to line-of-sight as those of the millimeter wavelength spectrum.

Time division multiplexing (TDM) is preferably utilized to provide multiple, seemingly simultaneous, communications on a single carrier channel. Here ones of the FDM channels are broken down into a predetermined number of discrete time slices (burst periods or timeslots) which form a frame. Each burst period may be utilized by a different subscriber so as to result in information communication contained in a single frame, having a number of TDM bursts, being directed to/from a number of subscribers over a single FDM channel.

Moreover, full duplexing may be synthesized on a single carrier channel by time division duplexing (TDD) through the use of burst periods like those used in TDM. Through TDD, Tx and Rx frames, each frame having one or more burst periods, are defined to provide communication in a particular direction at a predefined time. According to a most preferred embodiment, TDD of the present invention is adaptive (ATDD) to provide for dynamic sizing of the Tx and Rx frames. For example, allocation of burst periods to either a Tx frame or Rx frame may be based on the instantaneous traffic demands of the subscriber systems.

In a preferred embodiment, the central communication array or hub comprises a plurality of individual antenna elements, or other structure, for providing radiation of signals in predefined areas, or antenna beams, having subscriber systems deployed therein. Preferably, the hub is adapted to conduct simultaneous communication with multiple ones of the subscriber systems. Such simultaneous communications may be accomplished using a plurality of FDM channels wherein the channels themselves are sufficiently isolated to allow simultaneous communications at the hub. Additionally or alternatively, the hub may be adapted to provide isolation of FDM channels so as to allow their simultaneous use in communications. Accordingly, signals associated with a particular subscriber system may be communicated on one carrier channel while a signal associated with another subscriber system is communicated on another carrier channel. Where sufficient isolation exists in the simultaneous use of such FDM channels, a preferred embodiment of the present invention provides increased capacity through overlapping radiation of these FDM channels in a same service area.

In the preferred embodiment, wherein ATDD is utilized, the present invention operates to optimize utilization of bandwidth by dynamically allocating spectrum as forward (Tx) and reverse (Rx) link channels depending on traffic demands. However, where insufficient isolation exists between multiple FDM channels in simultaneous use, adjustment of the allocation of forward and reverse links in one channel may interfere with communications in another channel. For example, a first carrier channel Tx frame and Rx frame may be adjusted such that an overlap exists between the transmission of this first carrier channel by the hub with the receiving of a signal by a second carrier channel by the hub.

Accordingly, a preferred embodiment of the present invention operates groups (referred to herein as an interference group) of resources, such as the aforementioned carriers, prone to interference (whether co-channel interference, inter-carrier interference, or the like) for dynamic adjustment of ATDD forward and reverse links. Preferably, the carriers of an interference group are adjusted in "lockstep" fashion, such that each carrier is operated with a same forward and reverse link time and duration. Accordingly, the asymmetry of the carriers may be dynamic to serve the traffic demands, while avoiding interference between the carriers of an interference group.

Of course, depending upon the particular interference conditions experienced and the communication quality levels tolerable by particular systems, ones of the carriers of an interference group may be adjusted other than lockstep, if desired. For example, operation of the present invention may allow overlapping reverse link communication in one direction of another, or the remainder of the grouped carriers, by ones of the carriers of the interference group (i.e., forward link of carrier A may overlap reverse link of carrier B) while not allowing overlap in the other direction (i.e., reverse link of carrier A may not overlap forward link of carrier B).

A preferred embodiment of the present invention provides for common control of an interference group, such as through a processor based system utilizing forward and reverse traffic demand information (referred to herein as a traffic scheduler), such as may be determined instantaneously, historically, or even predictively, associated with all subscriber systems or other traffic sources assigned to all carriers within the interference group. Accordingly, an instantaneous forward/reverse ratio can be calculated and implemented for the entire group of carriers. Since all carriers within the interference group share common transmit and/or receive timing, operation of this preferred embodiment eliminates the aforementioned interference.

In an alternative embodiment of the present invention a plurality of traffic schedulers, such as one for each carrier, determine the proper instantaneous forward/reverse link ratios. For example, a traffic scheduler for each carrier will analyze forward and reverse traffic demand information for a particular carrier to determine desirable forward/reverse link ratios for use with that carrier. Each such traffic scheduler may also be provided information with respect to other carriers of the interference group, such as through communication with other traffic schedulers and or a centralized controller, analysis of interference experienced on an associated carrier channel, analysis of historical data, and/or the like. Accordingly, the traffic schedulers associated with the carriers of an interference group may each determine the proper forward/reverse ratio to be utilized.

Where carriers of an interference group are utilized to provide communication in a same service area, i.e., radiation of multiple carriers of an interference group overlap, a preferred embodiment of the present invention utilizes frequency-agile subscriber systems to optimize operation. For example, under direction of a traffic scheduler, the subscriber systems may vary the frequency (carrier channel) of operation of its receiver, transmitter, or both to allow the traffic scheduler to balance the instantaneous forward and reverse traffic demands across a plurality of carriers. Accordingly, a plurality of TDD carriers operating in dynamic lockstep asymmetry may be controlled to achieve gains in RF spectrum utilization equal or even better than the same number of carriers operating under independent dynamic asymmetry.

In the above described embodiments, the communication system may utilize an initialization algorithm, perhaps including a token passing arrangement for shared data users, to poll subscriber's systems and determine communication attributes of each such system as experienced at various resources, such as antenna beams, carrier channels, etcetera, of the central array. This information may be utilized, such as by the aforementioned traffic scheduler, to determine the optimum assignment of resources, including antenna elements, TDM burst periods, FDD frequency assignments, and TDD Tx and Rx time assignments for each such system, both initially (i.e., upon deployment and/or system reconfiguration) and during operation (i.e., under control of traffic schedulers). This information may additionally be utilized to provide secondary assignment of resources to maintain system integrity in the event of an anomalous occurrence, thereby providing system fault tolerance.

A technical advantage of the present invention is provided in that dynamic asymmetry of ATDD communications may be accomplished across a plurality of TDD carriers without introducing interference between/among the carriers.

Another technical advantage of one of the present intention is that full exploitation of the benefits of dynamic asymmetry associated with ATDD are provided.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
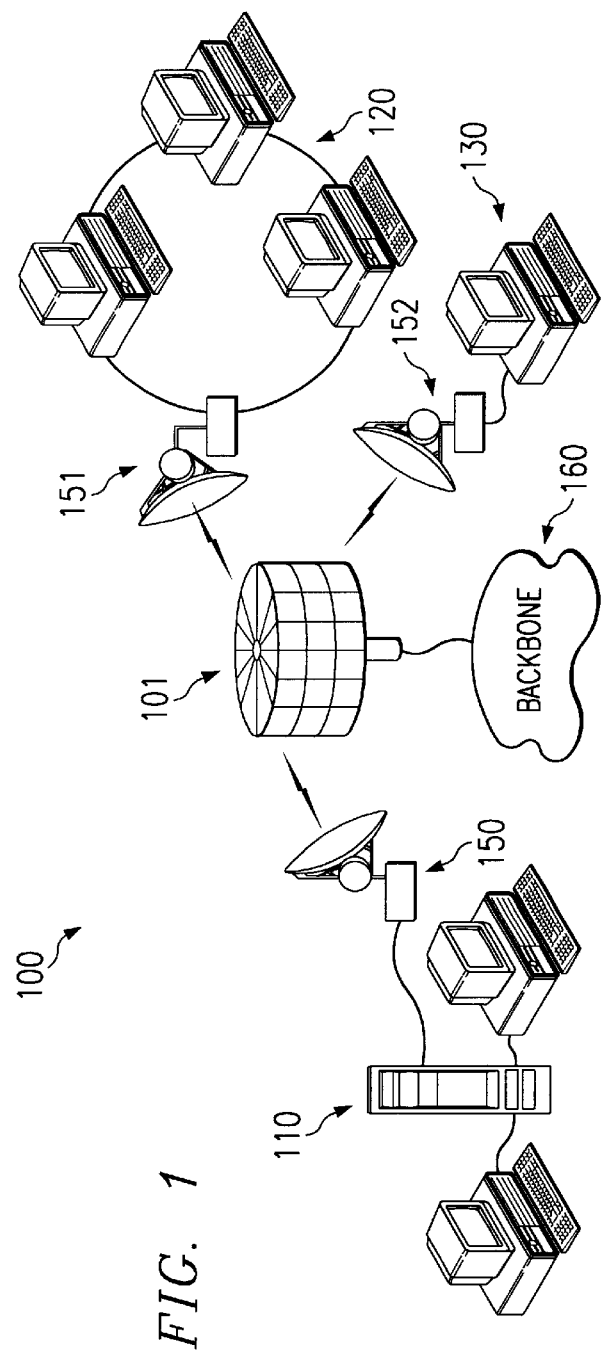
FIG. 1 illustrates the interconnection of processor-based systems of a preferred embodiment of the present invention.

The present invention provides high speed data communication via an air interface allowing data access to and from subscriber's remotely located systems. Referring to FIG. 1, it can be seen that such wireless communication may be utilized, for example, to provide high speed bridging of a physical gap between a plurality of processor-based systems, as illustrated by system 100. The processor-based systems may include, for example, local area networks (LAN), such as LANs 110 and 120, or individual computer systems, such as PC 130. It shall be appreciated that the processor-based systems utilizing the present invention may be general purpose computers, both standing alone and interconnected such as by a LAN. Furthermore, the system can connect other communication systems such as voice or video in combination with, or in place of, communication sourced by the above mentioned processor-based systems.

Systems bridged by the present invention may utilize a communication device, hereinafter referred to as a "node," for communicating with a centralized communication device also of the present invention, hereinafter referred to as a "hub." Still referring to FIG. 1, a hub is illustrated as element 101 and several nodes are illustrated as elements 150, 151, and 152 connected to LANs 110 and 120 as well as to PC 130, the combinations of which provide remote or subscriber systems.

Also, as illustrated in FIG. 1, such wireless communication may be utilized to provide high speed communication between a processor-based system, having a node coupled thereto, and communication backbone, such as backbone 160, through hub 101. It shall be understood that backbone 160 may be any form of communication means, such as a broadband fibre-optic gateway or other broadband data grade connection, T1 communications lines, a cable communication system, the Internet, or the like, coupled to hub 101. Moreover, backbones, such as illustrated by backbone 160, may be utilized to interconnect a plurality of hubs into a communications network.

Figure 2:
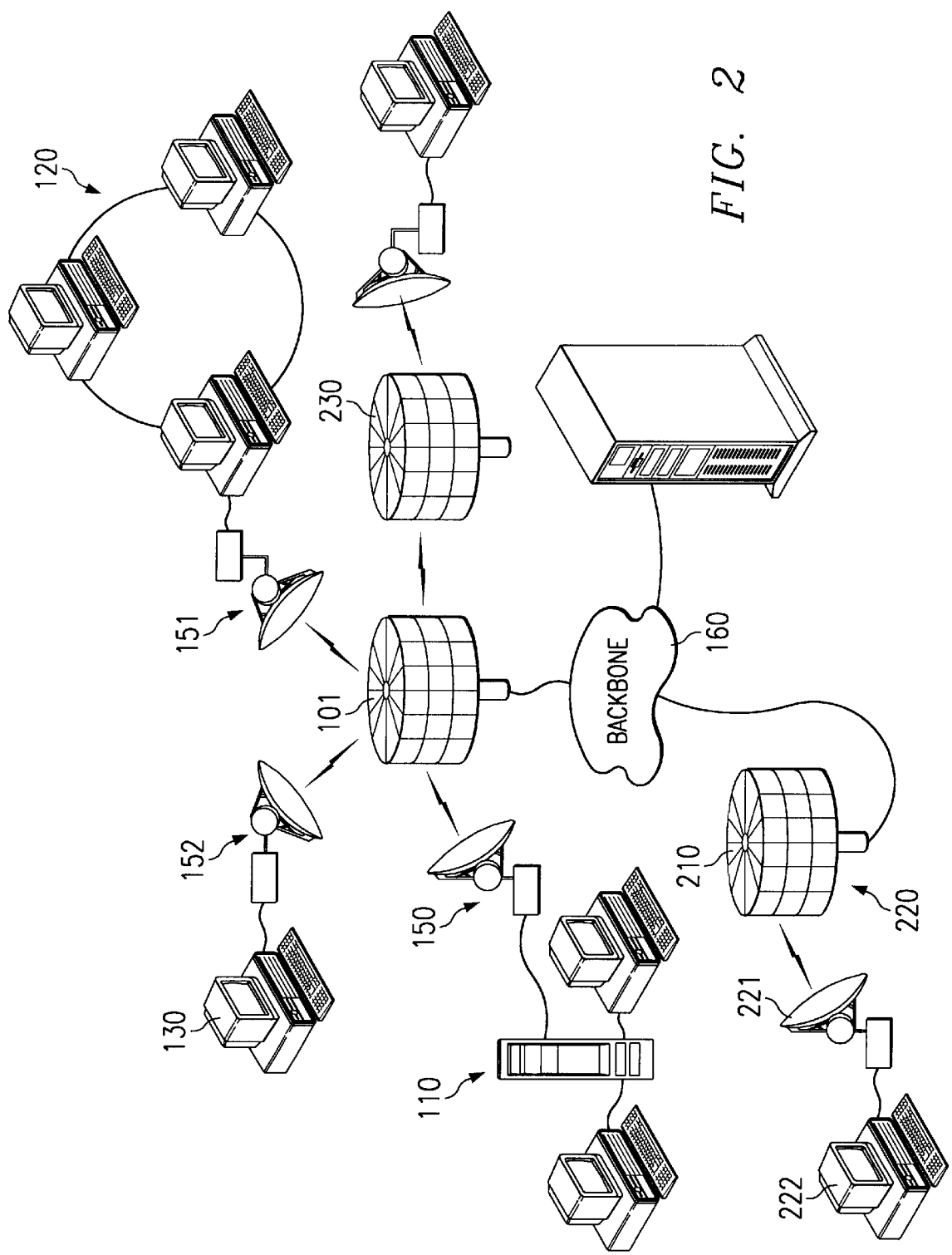
FIG. 2 illustrates the interconnection of processor-based systems through a network of hubs of the present invention.

Larger geographical distances between two communicating processor-based systems may be bridged by utilization of multiple hubs. A communication network comprising a plurality of hubs is illustrated in FIG. 2. As illustrated in FIG. 2, hubs 101 and 230 are in communication through an air link via antenna elements. These two hubs may provide information communication between any combination of processor-based systems in communication with either hub.

Through such a network, a node, such as node 150, in direct communication with one hub, such as hub 101, may communicate with a node, such as node 221, in direct communication with another hub, such as hub 220. Such communication may be accomplished through the two hubs interconnection via a backbone, such as backbone 160. Of course, it shall be understood that intercommunication between hubs may be accomplished through information "back-hauling" via air gap communication between two hubs such as is illustrated with hubs 101 and 230. It shall be appreciated that a communications network may include any number of hubs in communication with other hubs, through such means as air gap or direct backbone interconnection, or the like. Information communicated from a node in direct communication with one hub may be routed through various such interconnections to a node in direct communication with any hub of the communication network or in communication with the communication network through other means, such as through a connection to a backbone connected thereto.

Figure 3:
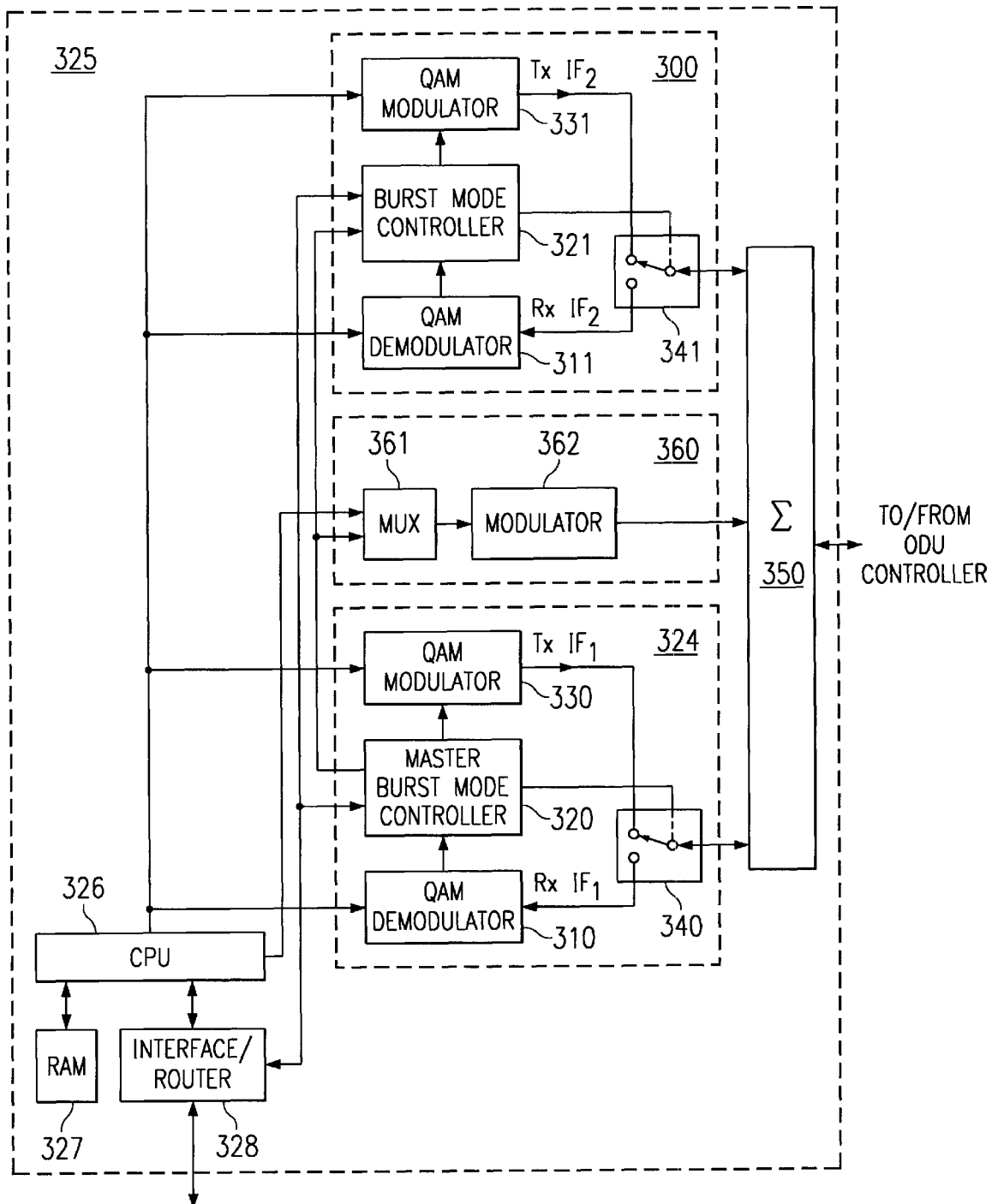
FIGS. 3 and 4 illustrate a preferred embodiment of the various components of a hub of the present invention.
Figure 4:
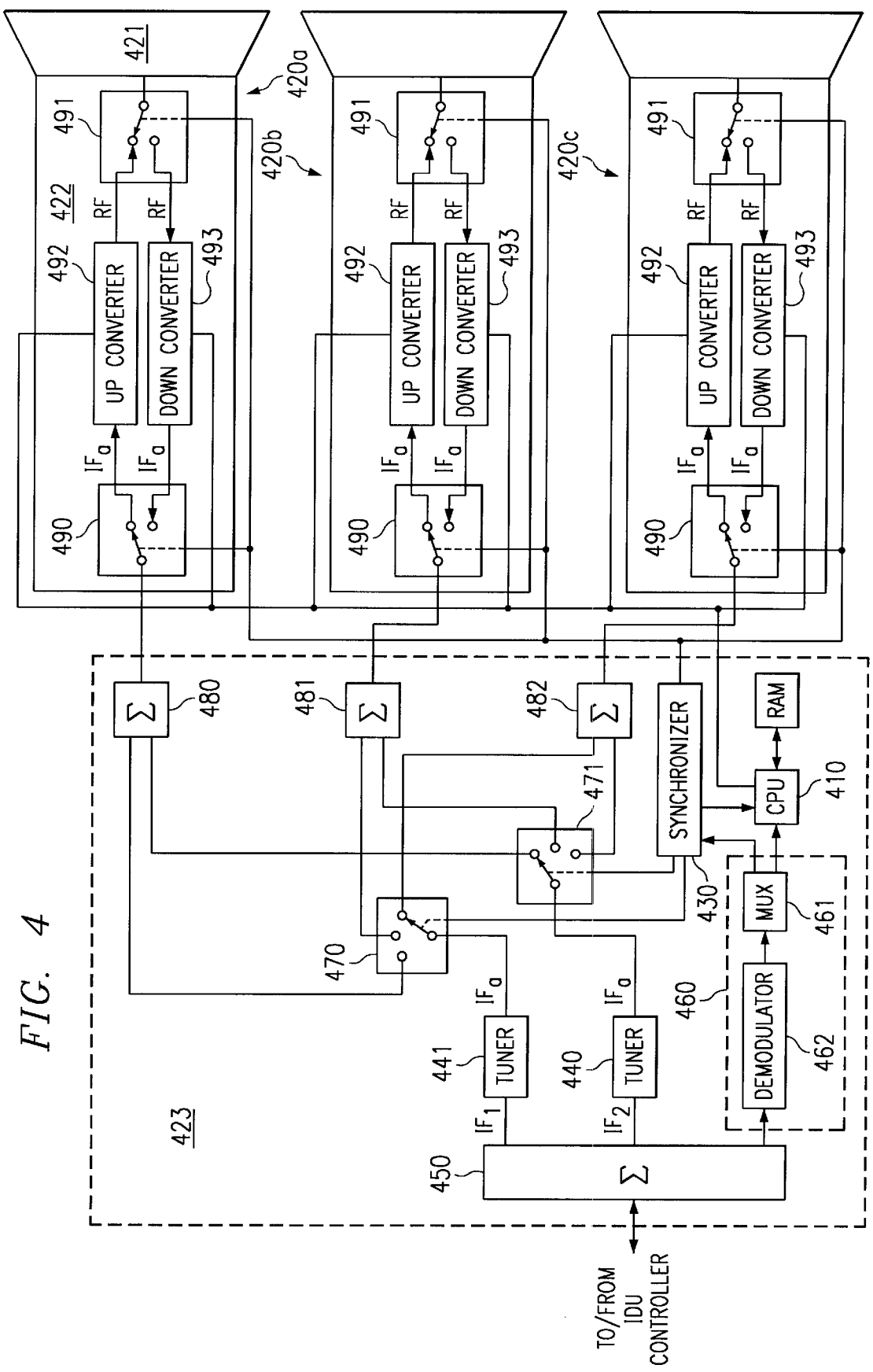

Directing attention to FIGS. 3 and 4 components of a preferred embodiment hub of the present invention are shown. Specifically, FIG. 3 shows the components of a preferred embodiment hub "indoor unit" (IDU) controller, IDU controller 325, and FIG. 4 shows the components of a preferred embodiment hub "outdoor unit" (ODU) controller, ODU controller 423.

Referring to FIG. 4, it can be seen that each antenna element 420a–420b of the preferred embodiment, comprised of antenna 421 and module 422, are in communication with ODU controller 423. In a preferred embodiment, where EHF is used, antenna 421 is a hybrid mode lens corrected horn providing approximately 32 dB of gain. Module 422 of this preferred embodiment is a synthesized mmWave front-end module accepting and transmitting 38 GHz radio frequency energy through horn 421 converted to/from an intermediate frequency (IF), such as in the range of 400–500 MHz, for communication with a modem, such as modem 324 illustrated in FIG. 3. Of course, depending on the carrier frequency used, the components of the antenna elements may be different than that stated above. Likewise, the antenna and module attributes of the antenna elements may be different than that stated above where, for example, a different carrier frequency or beam pattern is desired.

The preferred operation of ODU controller 423 results in each individual antenna element being in communication with IDU controller 325 according to a predetermined regimen of communication sequence timing, i.e., frames of burst periods. This, in turn, results in each individual antenna element being in communication with modems 300 and 324 within IDU controller 325. It shall be appreciated that such switching results in the time division multiplexing (TDM) of each antenna element to modems 300 and 324.

Through the selection of transmit and receive circuitry in combination with the switching of ODU controller 423, the antenna elements may be coupled to modems 300 and 324 at the proper instances to provide bi-directional communication through modems 300 and 324 resulting in time division duplexing (TDD).

Moreover, in addition, or in the alternative, to control for TDD switching of antenna elements, a connection between the antenna elements and ODU 423 may be utilized for other control functions. For example, a control signal through such a connection may be used to dynamically adjust an antenna element for a particular frequency determined to be suitable for communication with a communication device during a particular burst period of a frame. In a preferred embodiment, a control signal is provided by CPU 410 to a tuner, such as up/down-converters 492 and 493 within antenna module 422, as shown in FIG. 4. Such a control signal may be provided by the control processor to program phase lock loop circuitry, or synthesizer hardware, within the various antenna modules to select a particular frequency for transmission and/or reception of communicated information. Likewise, a control signal may be provided to adjust the amplitude of a transmitted or received signal. For example, tuners 492 and/or 493 may include amplification/attenuation circuitry adjustable under control of such a control signal. It shall be appreciated that both of the above described control functions result in a method by which the various antenna elements may be dynamically configured to communicate with nodes of the system.

The preferred embodiment IDU controller 325 of FIG. 3 includes a processor identified as CPU 326, memory identified as RAM 327, and an interface and/or router identified as interface/router 328. Stored within RAM 327 is a switching instruction algorithm to provide switching instruction or synchronization to ODU controller 323. Buffering for information communicated through modems 300 and/or 324 or interface/router 328 may also be provided by RAM 327. Likewise, RAM 327 may also contain additional stored information such as, for example, antenna element correlation tables, link management information, initialization instructions, modem configuration instructions, power control instructions, error correction algorithms, and other operation instructions.

Modems 324 and 300 of FIG. 3 are preferably similarly configured to include burst mode controllers 320 and 321, QAM modulators 330 and 331, QAM demodulators 310 and 311, as well as channel direction control circuitry, shown as TDD switches 340 and 341. However, it shall be appreciated that burst mode controller 321 is preferably synchronized with master burst mode controller 320 as well as sync channel modulator 360. This synchronization of burst mode controllers, illustrated as a control signal provided by master burst mode controller 320, is to provide a means by which the burst periods, and thus the communication frames, of the modems as well as the TDMA switching of the individual antenna elements may be fully synchronized. In the preferred embodiment, the synchronization clock is sourced from interface/router 328 and is derived from the bit stream by master burst mode controller 320. Of course, synchronization may be accomplished by means other than the use of a control signal provided by a master burst mode controller, such as the use of internal or external clock sources, if desired. One advantage of synchronization of the various components of the hub is restricting transmission and reception by each of the individual antenna elements to predefined time periods which allows for a greater reuse of channels.

It shall be understood that sync channel modulator 360 provides a means by which the timing information of the burst mode controllers may be modulated for provision to ODU controller 423. It shall be appreciated that in the preferred embodiment where CPU 326 provides control signals to the ODU for the above discussed control functions, sync channel modulator 360 may also include MUX 361 to provide a multiplexed signal to modulator 362.

Preferably the signals of the various modems of the hub are imposed upon different carrier frequencies, such as is illustrated by $IF_1$ of modem 324 and $IF_2$ of modem 300. Similarly, sync channel modulator 360 preferably imposes the control signal including the burst mode timing information and control functions on a suitable IF. These separate signals may then be easily combined by splitter/combiner 350 for transmission through a unitary coupling to ODU controller 423. Of course the same IF could be used as a carrier by the modems of the hub if, for example, multiple connections or a multiplexer connection were maintained between IDU controller 325 and ODU controller 423.

It shall be appreciated that increasing capacity by adding multiple modems to IDU. controller 325 requires circuitry in ODU controller 423 in addition to the switch enabling TDMA access to a single data stream of one modem discussed above. Attention is again directed toward FIG. 4 wherein ODU controller circuitry corresponding to the inclusion of multiple modems within IDU controller 325 is shown.

It shall be appreciated that switches 470 and 471 and signal splitter/combiners 480, 481, and 482 in combination with synchronizer 430 accomplish TDMA switching of the antenna elements with respect to the individual modems as described previously with reference to the use of a single modem. There is also illustrated, in communication with CPU 410, sync channel modulator 460 utilized to demodulate the burst mode control signal and various other control signals provided the ODU by the unitary connection illustrated. In the preferred embodiment, where control signals are transmitted from the IDU controller to the ODU controller, sync channel modulator includes MUX 461 in combination with demodulator 462 to provide CPU 410 with control information was well as providing synchronizer 430 with timing information. Of course, where multiple connections are used between the ODU and IDU, sync channel modulator 460 may be omitted.

Switches 470 and 471 are adapted to provide selection of the different data streams provided by each modem, as tuned to a common intermediate frequency by tuners 440 and 441, to the antenna elements. In the preferred embodiment, as discussed above, module 422 of the antenna element is adapted to accept intermediate frequencies and convert them for transmission at the desired frequency through horn 421. In the preferred embodiment, module 422 is adapted to accept a single IF. Therefore, ODU controller 423 includes tuners 440 and 441 to adjust the various intermediate frequencies of the different modems, here $IF_1$ and $IF_2$, to a common intermediate frequency $IF_a$. It shall be appreciated, although a single bi-directional tuner for each IF is illustrated, that a separate tuner for the transmit and receive signal path, coupled to the bi-directional signal path by TDD switches, may be utilized if desired. Such an arrangement is discussed in detail below with respect to antenna module 422.

Although being adjusted to a common frequency, the signals from the modems are physically separated for switchable connection to a proper antenna element, through signal combiners 480, 481, and 482, by switches 470 and 471 under control of synchronizer 430. It shall be appreciated that, by controlling switches 470 and 471, any sequence of burst periods from any modem may be transmitted by any antenna element.

Although selection of the signal modulated by a particular modem has been discussed with reference to switches operating under control of a synchronizer circuit, it shall be appreciated that this function may be accomplished by any number of means. For example, module 422 may be adapted to accept various intermediate frequencies. A variable tuner in module 422, such as through the use of programmable phase lock loop circuitry, could be utilized to select a signal modulated by a particular modem from a composite signal by tuning to a particular intermediate frequency under control of CPU 410 and synchronizer circuitry 430. Of course, where tuners are utilized to discriminate between the various signals modulated by the modems, tuners 440 and 441 as well as switches 470 and 471 and signal combiners 480, 481, and 482 may be eliminated, if desired.

It shall be appreciated that the use of short burst periods, such as on the order of micro-seconds, requires that such a variable tuner tune to a desired frequency and reach a steady state quickly in order to avoid significant signal distortion. Consistent with this, experimentation has revealed that the use of the above mentioned switching matrix is advantageous.in providing selection of the various signals within the burst periods contemplated.

In the preferred embodiment, each antenna element is adapted for bidirectional communication. Therefore, each antenna module 422 may include TDD switches 490 and 491 coupled to synchronizer 430 to provide synchronous switching the antenna element during transmit and receive frames, as is illustrated with respect to antenna elements 420a–420c.

Moreover, as it is anticipated that the communicated RF frequency of the system will be different than that of the IF utilized within the various components of the communication system, each antenna module 422 may also include a tuner to up-convert and/or down-convert the IF to the desired RF for radio communication. The use of tuners to both up-convert and down-convert the signal is illustrated in FIG. 4 as up converter 492 and down converter 493. It shall be appreciated, although a converter is illustrated for both the transmit and receive signal path within antenna module 422, that a single bi-directional converter may be utilized if desired. Of course, where a bi-directional converter is used, TDD switches 490 and 491 may be eliminated to result in a configuration as discussed above with respect to IF tuners 440 and 441.

Each channel is preferably divided into predefined TDMA time slots. These TDMA time slots may be utilized to communicate user information and/or control information and may be adjustable in duration. For example, a TDMA time slot may be broken down into control channel information and user information, such as may be a user information data packet formatted for a particular predefined protocol. There are innumerable methods by which to utilize the above disclosed frequency spectrum for communication. It shall be understood that any such method may be utilized according to the present invention.

In addition to communication of information between processor-based systems through hub 101, control functions may also be communicated between hub 101 and node 150. Such control communications may be provided in a particular TDMA time slot and/or a particular portion of a TDMA time slot. Alternatively, control functions may be communicated through a predetermined channel or sub-channel of the FDM spectrum. These control functions might include requests for re-transmission of a data packet, requests to adjust the amplitude of the transmitted signal, TDM timing information, instructions to adjust the modulation density, or dynamic assignment of hub resources.

Figure 5:
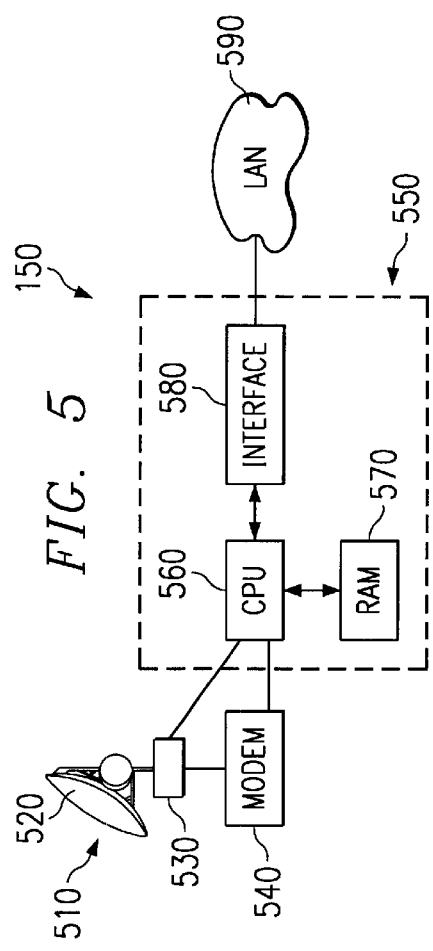
FIG. 5 illustrates an embodiment of a node of the present invention.

Having described in detail hub 101 of the present invention, attention is now directed toward FIG. 5 wherein node 150 is more fully illustrated. In a preferred embodiment node 150 is comprised of two primary components, outdoor unit 510 and indoor unit 550, as depicted in FIG. 5.

Outdoor unit 510 includes antenna 520, module 530 and modem 540. Where EHF is used, antenna 520 is preferably a parabolic dish antenna providing approximately 42 dB of gain with a communication lobe of approximately 2 degrees. Module 530, like module 422 discussed above, is preferably a synthesized mmWave front-end module accepting and transmitting 38 GHz RF through antenna 520 converted to an IF in the range of 400–500 MHz for communication with RF modem 540. Preferably, module 530 includes the various tuner and TDD switching components illustrated in FIG. 4 with respect to module 422. However, it shall be understood that any number of component configurations are acceptable for use in module 530, as they are in module 422. It shall be appreciated that the link illustrated between CPU 560 and module 530 may provide a signal controlling the synchronized switching the synchronized switching of the TDD switches according to a TDD frame of an associated hub. Modem 540 may be a variable rate modem, having a baud rate with variable density of bits per symbol and/or a variable baud rate, corresponding to the use of a variable rate modem utilized at an associated hub. Of course the antenna and module attributes of node 150 may be different than that stated above where, for example, a different carrier frequency or beam pattern is desired.

Indoor unit 550 preferably includes CPU 560, RAM 570 and interface 580. It shall be understood that indoor unit 550 and outdoor unit 510 are coupled such that information received by antenna 520 as RF energy is communicated to indoor unit 550.

Interface 580 provides data communication between indoor unit 550, and thus node 150, and a processor-based system such as LAN 590 illustrated in FIG. 5. Furthermore, interface 580 formats the data communication to be compatible with the processor-based system so coupled. As for example, where LAN 590 is coupled to node 150, interface 580 may both send and receive Ethernet data packets where LAN 590 utilizes Ethernet compatible communication protocol. However, where node 150 is coupled to a single computer, it may be advantageous for interface 580 to provide asynchronous receive/transmit protocol. It shall be appreciated by one of skill in the art that interface 580 may include multiple communications protocols within a single embodiment, being user selectable, or may be individual modules to be included within controller 550 as needed.

RAM 570 is preferably coupled to both interface 580 and CPU 560. Where TDM is being used at hub 101, RAM 570 may store information received at node 150 through interface 580 while awaiting transmission to hub 101. RAM 570 may also contain additional stored information such as, for example, initialization instructions and link management information such as modem configuration instructions, power control instructions and error correction instructions discussed in detail below.

For example, a control signal may be provided by CPU 560 to a tuner within antenna module 530. Such a control signal may be provided by the control processor to program phase lock loop circuitry, or synthesizer hardware, within the antenna module to select a particular frequency for transmission and/or reception of communicated information. Likewise, a control signal may be provided to adjust the amplitude of a transmitted or received signal. For example, tuners within module 530, such as those illustrated in module 422 in FIG. 4, may include amplification/attenuation circuitry adjustable under control of such a control signal. These attributes, as well as the adjustment of the information density of communicated data, may be made by the node in response to a determination made at the hub and communicated through a control channel or may be made by an algorithm at the node. It shall be appreciated that adjustment of some attributes by the node may require a corresponding adjustment at the hub, such as with adjustment of QAM rate or channel. Therefore, the node may communicate control functions to the hub in such situations.

In addition to storing communication information and associated link maintenance algorithms, in the preferred embodiment RAM 570 is utilized to store instructions to be utilized by CPU 560 in operating node 150. Such instructions may include channels in the available spectrum not to be utilized by node 150, windows of communication available for communication between node 150 and hub 101 due to TDM, and synchronizing information, such as frame timing and propagation delay offset, to enable TDM and/or TDD communication. Furthermore, RAM 570 may also store instructions to be utilized by CPU 560 for dynamic assignment of hub resources such as the above mentioned channels available for communication and windows of communication, or burst periods, as discussed hereinafter.

Having described the preferred embodiment hub and node of the present invention in detail, operation according to a preferred embodiment will now be described. When deployed, a cellular frequency reuse pattern of a plurality of hubs of the present invention is envisioned. Such a cellular pattern presents added complexity in the reuse of individual channels as the use of the channels at each hub must also take into consideration use of channels at adjacent hubs.

Figure 6:
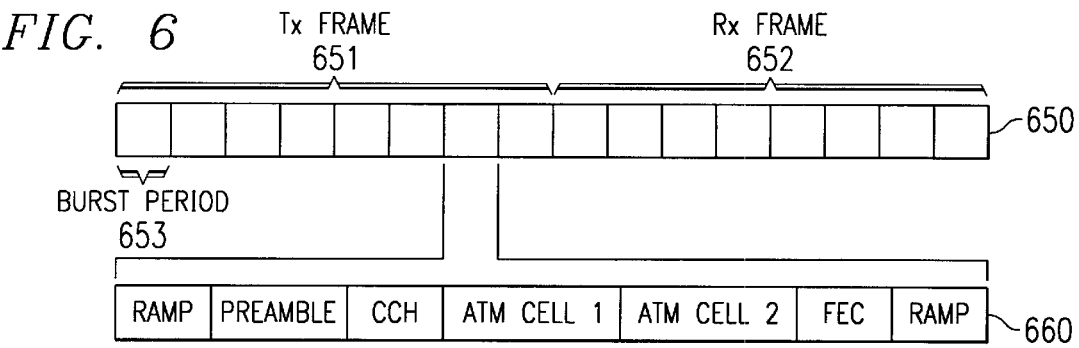
FIG. 6 illustrates an embodiment of the composition of a signal communicated by the present invention during a time division duplex burst period.

Time division duplexing (TDD) is the preferred means by which a full duplex link between the hub and a node or subscriber is enabled. Each Tx and Rx frame of a TDD carrier channel may be divided into discrete burst periods to provide for TDMA utilization of each channel. According to one embodiment, Tx and Rx frames, each being 250 $\mu$sec, are divided into eight burst periods, as is illustrated in FIG. 6, whereby full duplexing may be synthesized in sixteen such burst periods. The TDMA burst periods may be further broken down into protocol time slots; a protocol time slot being a sufficient time for communicating an information packet formatted to a predefined protocol. For example, each channel may be utilized to communicate two 53 byte ATM cells in a TDMA burst period utilizing QAM.

A preferred embodiment of information formatting within a TDMA burst period is illustrated as burst 660 in FIG. 6. It shall be appreciated that this example of information formatting is but one embodiment of communication utilizing TDMA burst periods. There are innumerable methods by which to utilize the above disclosed burst periods of the Tx and Rx frames for communication.

It shall be understood that the burst periods of each Tx and Rx frame may be utilized by a single antenna element to provide carrier channel TDMA to one node or multiple nodes located within the antenna element's radiation pattern. For example, burst periods 1 and 2 may be used by an antenna element to provide communication to a first node while burst periods 3 through 7 are used by the same antenna element to provide communication to a second node. Likewise, a single Tx or Rx frame may be utilized by different antenna elements. For example, burst periods 1 through 4 may be used by a first antenna element to provide communication to a first node while burst periods 5 through 8 are used by a second antenna element to provide communication to a second node.

It shall be appreciated that combinations of the above mentioned TDMA use of the burst periods by a single antenna element and division of Tx and Rx frames between different antenna elements may be utilized by the present invention. For example, burst periods 1 and 2 may be used by an antenna element to provide TDMA communication to a first node and second node while burst periods 3 and 4 are used by a second antenna element to provide communication to a third node.

As RF spectrum is often expensive and usually limited in availability, the present invention is preferably adapted to efficiently utilize spectrum allocated for use therewith. Accordingly, the preferred embodiment of the present invention employs adaptive time division duplexing (ATDD) to allow for dynamic asymmetry in the forward and reverse links which may include both the dynamic allocation of burst periods in forward and reverse links and/or dynamic adjustment of burst periods themselves. Accordingly, the preferred embodiment of the present invention operates to optimize utilization of bandwidth by dynamically allocating spectrum as forward (Tx) and reverse (Rx) link channels depending on traffic demands.

Specifically, the time division duplex architecture of the preferred embodiment is able to leverage the benefits of the dynamic asymmetry or ATDD to change the size of the forward and reverse links in proportion to traffic demand. At a given hub site it is possible to have situations wherein the instantaneous traffic demands on one carrier versus another suggest ATDD adjustment such that one carrier channel would be transmitting while another is receiving (referred to herein as asynchronous ATDD).

Preferably, the adaptive duplexing of the present invention is based around a traffic schedule. For example, a traffic scheduler of the present invention may monitor the instantaneous traffic demands on both forward and reverse links to thereby determine the appropriate amount of ATDD and/or asymmetry at which to operate the carrier channels. The traffic scheduler of the preferred embodiment of the present invention is operable upon a processor (CPU) and associated memory (RAM) of a hub of the present invention. Of course, additional and/or other apparatus, such as a general purpose processor based computer system having an appropriate algorithm controlling operation thereof, may be utilized for operation of the traffic scheduler of the present invention.

Figure 7:
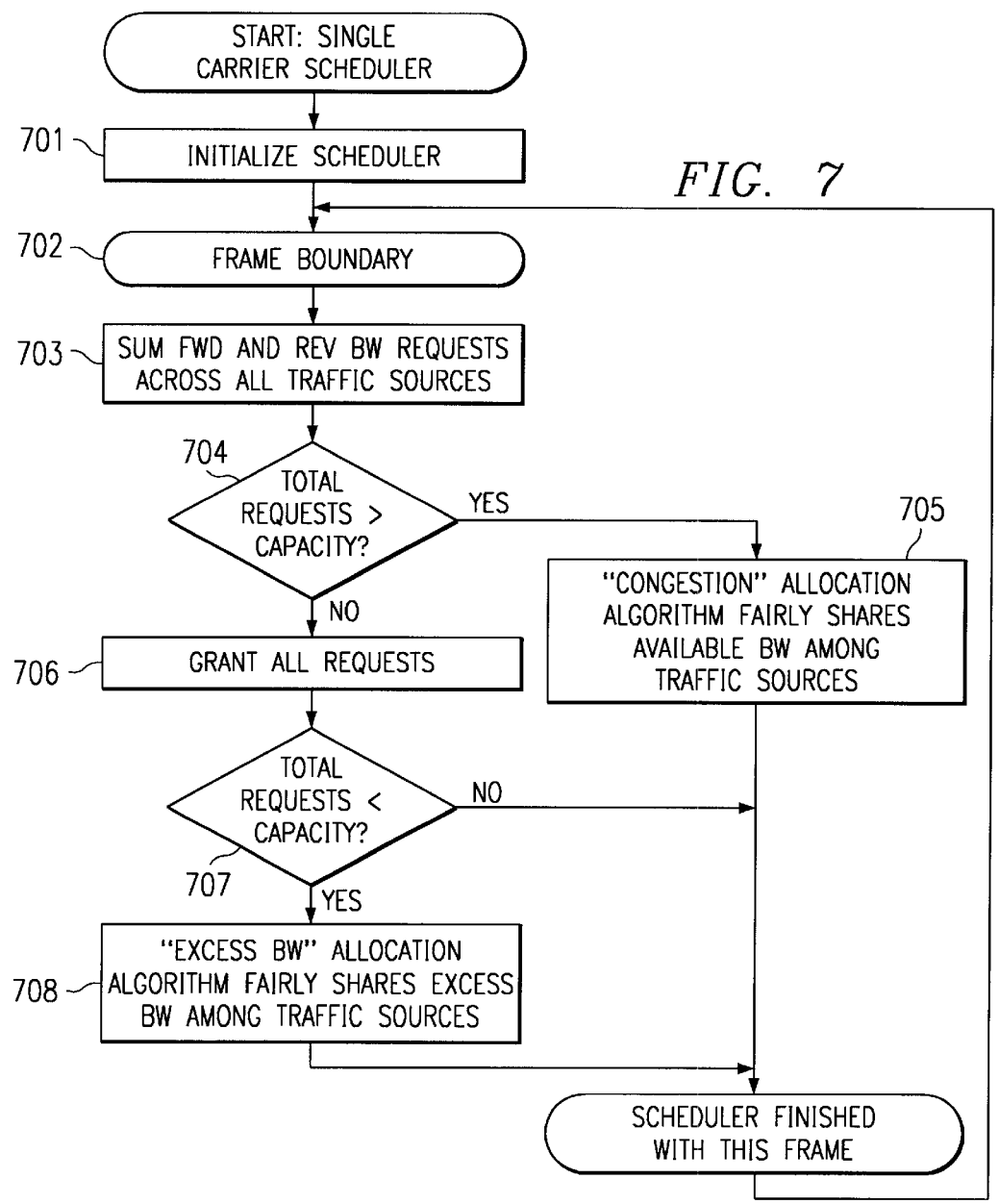
FIG. 7 illustrates a flow diagram of a preferred embodiment of the present invention operable to provide adaptive time division duplexing.

Directing attention to FIG. 7, a preferred embodiment flow diagram of operation of a traffic scheduler of the present invention to provide ATDD is shown. The embodiment of FIG. 7 is simplified to provide ATDD for a single carrier in order to aid in understanding the concepts of the present invention. The use of multiple carriers in providing ATDD is described in detail with reference to FIGS. 8A and 8B herein.

The preferred embodiment of FIG. 7 begins at step 701 wherein a traffic scheduler of the present invention is initialized. For example, the traffic scheduler may be provided with information regarding the number of remotes operable at the carrier frequency, the position of the remotes, such as particular antenna beams and/or hubs the remotes are operable with, modulation levels which may be utilized with particular remotes, antenna beams and/or communications conditions, the number of subscribers utilizing the system, such as the distribution of subscribers at the remote sites, the number of queues for data communication, the number of traffic priorities, such as particular remotes and/or types of data to give transmission priority, minimum bandwidth guarantees, such as particular remotes contracting for guaranteed minimum bandwidth availability and/or the times of guaranteed bandwidth, and/or like information useful in making intelligent bandwidth allocation decisions.

At step 702 a frame boundary for which a determination of allocation of ATDD resources is identified. Preferably a new schedule is created once per frame in response to bandwidth demand on the links or requests issued by the various traffic sources, e.g., remote systems. However, alternative embodiments rely upon schedule determinations for use in multiple frames, such as a super frame comprised of a predetermined plurality of individual frames. Additionally or alternatively, schedule determinations may be made in response to particular events, such as a determination that particular queues have reached a predetermined threshold of delayed data packets.

At step 703, the traffic scheduler accumulates and analyzes bandwidth demands placed on the links and/or bandwidth requests issued by the various traffic sources to determine traffic exigencies. Accordingly, the preferred embodiment of FIG. 7 sums the forward and reverse traffic demands/requests across all traffic sources.

At step 704 a determination is made as to whether the instantaneous traffic exigencies exceed link capacity. If the instantaneous traffic exigencies are not within the link capacity, then processing proceeds to step 705.

At step 705 a congestion allocation algorithm is preferably instigated and thereafter the traffic scheduler of this preferred embodiment has completed operation with respect to the selected frame. The congestion allocation algorithm of step 705 allocates available bandwidth among the traffic sources to fairly share the bandwidth there between.

For example, one embodiment of the present invention operates to determine an amount by which link capacity is exceeded (link deficiency), such as a percentage. Thereafter, the congestion allocation algorithm operates to grant bandwidth to each traffic source with an amount of deficiency with respect to the demand/requested amount corresponding to the link deficiency, i.e., if there is a 20% link deficiency, only 80% of each demand/request is fulfilled. Such an embodiment operates to evenly distribute the deficiency among the traffic sources.

However, it should be appreciated that even distribution of a capacity deficiency among traffic sources may not always be desired. For example, where particular data is to be given priority and/or where particular bandwidth guarantees have been given with respect to particular data or traffic sources, a completely prorata distribution of capacity deficiency may not be desired. Accordingly, a preferred embodiment of the present invention operates to weight the demands/requests according to criteria, such as the aforementioned priority and capacity guarantees, to thereby allocate the available bandwidth more favorably to particular traffic sources.

The above preferred embodiment operation of the congestion allocation algorithm further operates to determine if weighting as described above results in allocation of bandwidth to a particular traffic source below a guaranteed bandwidth. If so, the guaranteed bandwidth is assigned to that traffic source and the weighted distribution of bandwidth is reapplied to the remaining traffic sources with respect to the remaining bandwidth.

It should be appreciated that there are numerous techniques by which the available bandwidth may be allocated fairly among the traffic sources according to the present invention. Accordingly, operation of the present invention is not limited to the specific allocations of bandwidth described above. For example, the congestion allocation algorithm may operate to always assign a guaranteed amount of bandwidth to particular traffic sources and then allocate remaining bandwidth to other traffic sources, either according to a weighting scheme as described above, or otherwise.

If at step 704 the instantaneous traffic exigencies are within the link capacity, then processing proceeds to step 706. At step 706 all demands/requests are granted by assigning burst periods and/or adjusting burst period durations to accommodate each traffic source's forward link demands/requests and each traffic source's reverse link demands/requests.

For example, if three remote systems are operable with the carrier being scheduled and two remote systems are requesting forward link communications but no reverse link communications and the remaining remote system is requesting reverse link communications but no forward link communications, step 706 may adjust the frame to comprise two forward link bursts and one reverse link burst. Accordingly, step 706 may grant the two forward link bursts to the appropriate remotes and the one reverse link burst to the appropriate remote. Moreover, where the two forward link remotes are not desirous of a same amount of forward link capacity, step 706 may adjust the burst period durations to correspond to the capacity desired by each remote. Likewise, the reverse link burst period duration may be adjusted according to the capacity desired. As such, step 706 operates to allocate the fixed amount of bandwidth available in a frame to the traffic sources communicating via the frame in a prorata fashion.

At step 707 it is determined if the total instantaneous traffic exigencies are less that the link capacity. If the total instantaneous traffic exigencies are not less than the link capacity, indicating full utilization of the link, this preferred embodiment has completed operation with respect to the selected frame and processing is preferably returned to step 702 where a next frame is selected.

However, if it is determined that the total instantaneous traffic exigencies are less than the link capacity, indicating reserve capacity in the link, this preferred embodiment proceeds to step 708. At step 708 an excess bandwidth allocation algorithm is preferably instigated and thereafter the traffic scheduler of this preferred embodiment has completed operation with respect to the selected frame.

The excess bandwidth allocation algorithm of step 708 preferably allocates the excess bandwidth among the traffic sources to fairly share the bandwidth there between. For example, the excess bandwidth may be equally divided and allocated among the various traffic sources. Alternatively, the traffic sources may be weighted for distribution of the excess bandwidth. Of course, other techniques for distributing excess bandwidth may be utilized according to the present invention. For example, the excess bandwidth may be utilized for overhead channel communications such as to adjust operation of communication system components, collect operation statistics compiled and stored by various components, provide operations, acquisition, maintenance and provisioning (OAM&P) messaging, and/or the like. Additionally or alternatively, the excess bandwidth may be utilized to provide an intermittent user payload channel, such as for use as a very low priority communication link.

In many circumstances communication systems utilized according to the present invention, such as those shown and described above, can tolerate asymmetric ATDD between multiple carriers. There is often enough isolation between the antenna structures serving various areas or sectors of a service area to allow operation of the carriers entirely independently in terms of their forward/reverse ratio or asymmetry. For example, even in cases where two antennas are illuminating the same geographic coverage area, if the antennas are disposed a sufficient distance apart, such as one meter apart for millimeter wave applications, there may be sufficient isolation to allow one carrier channel to be received and another to be transmitted simultaneously.

However, where insufficient isolation exists between multiple FDM carrier channels in simultaneous use, such as may be the case where frequency bands lower than millimeter wave are used or where multi-carrier transceivers are used, adjustment of the allocation of forward and reverse links in one carrier channel may interfere with communications in another carrier channel. For example, a first carrier channel Tx frame and Rx frame may be adjusted such that an overlap exists between the transmission of this first carrier channel by the hub with the receiving of a signal by a second carrier channel, such as may be channeled at a frequency close to that of the first carrier channel, by the hub. Likewise, where insufficient isolation exists between instances of reuse of a particular carrier channel, intolerable levels of co-channel interference may result from adjustment of the allocation of forward and reverse links in one instant of the carrier channel use without corresponding adjustment of another instant of the carrier channel use.

Accordingly, a preferred embodiment of the present invention operates groups of carriers prone to interference (an interference group) for dynamic adjustment of ATDD forward and reverse links. The resources associated with a particular interference group may be carrier channels utilized at particular hubs and/or particular antenna elements or antenna beams which may cause unacceptable levels of interference with one another if allowed to transmit signals when another carrier channel of the group is receiving, and vice versa (asynchronous ATDD). Accordingly, not only may an interference group identify potentially interfering carrier channels, but the interference group may also identify particular antenna beams in which asynchronous ATDD use of ones of the carrier channels would result in undesired interference, particular hubs and/or nodes of a communication network in which asynchronous ATDD use of ones of the carrier channels would result in undesired interference, and possibly even particular time bursts in which asynchronous ATDD use of ones of the carrier channels would result in undesired interference or other operational impediments.

Operation wherein the identification of interference groups for the use of ATDD according to the present invention may be particularly useful is the situation wherein a plurality of carrier channels are used in providing communications in a same service area, i.e., a particular sector or an omni cell. For example, it may become desirable due to the density of subscribers, and thus capacity requirements, to operate more than one carrier in a given sector. In such a situation, undesired inter-carrier interference can occur in a variety of implementations.

One hub implementation, where the provision of multiple carriers in a service area may prevent the use of asynchronous ATDD, is where two or more ATDD carriers operate from the same hub transceiver and/or antenna hardware. In such a shared transceiver embodiment, the transmitter and receiver portions of the transceiver assembly may be coupled to the antenna by means of a single pole double throw switch. Accordingly, the transceiver is adapted for instantaneous operation in either receive or transmit mode. Therefore, operation of more than one carrier with independent dynamic asymmetry on each carrier would not be possible.

In a shared antenna embodiment, the carrier channels may be operated from independent transceivers, but coupled to a common antenna by a combining network. Finite isolation between the ports of the combining network will, in many cases, prevent asynchronous ATDD with respect to the carrier channels combined because, for example, sideband noise emanating from a transmit carrier will desensitize a receive carrier.

It is possible to operate two or more TDD carriers from different hub transceiver and antenna hardware structures to provide communication services in a same service area. However, where insufficient RF isolation exists between these separate structures, such as where their physical placement is in close proximity, it may not be possible for these carrier channels to operate with independent dynamic asymmetry (asynchronous ATDD) because of, for example, sideband noise emanating from one or more transmit carriers desensitizing a receiver or receivers.

In addition to limitations on asynchronous ATDD associated with carrier channels used in a same service area, adjacent or nearby use of particular carrier channels, such as within adjacent antenna beams and/or at a neighboring cell, may provide undesired results. For example, even using different hub transceiver and antenna hardware structures to provide communication services in adjacent service areas may result in insufficient isolation to achieve acceptable asynchronous ATDD because, for example, sideband noise emanating from transmit carriers may desensitize receive carriers.

In order to maximize use of the available spectrum, a preferred embodiment of the present invention will reuse frequencies not only at hubs of the network, but also within a particular hub. Accordingly, two or more service areas associated with a particular hub may utilize a same carrier channel. Independent dynamic asymmetry (asynchronous ATDD) is possible in such implementations provided sufficient isolation between the antennas illuminating these service areas is available. However, if such isolation is insufficient, asymmetric ATDD may not be possible. For example, reuse of carrier channels at a hub, such as where carrier channels are reused in sectors 180° apart, and the antenna elements provide limited front to back isolation and they are not spaced a sufficient distance apart, the use of asynchronous ATDD with respect to the carrier channel used by these antenna elements may be undesired.

As shown above, transmitter sideband noise, and other considerations such as physical implementations, may impose limitations on operation of TDD carriers utilizing different or dynamic forward/reverse ratios. Although one solution to problems associated with interference between carriers using ATDD as described above is to force all carriers prone to such interference to operate with a static forward/reverse ratio. However, it should be appreciated that in such a technique, the benefits of efficient RF spectrum utilization provided by dynamic asymmetry would be lost.

Accordingly, in a preferred embodiment of the present invention the carriers of an interference group are adjusted in "lockstep" fashion, such that each carrier of the interference group is operated with a same forward and/or reverse link time and duration. Accordingly, the asymmetry of the carriers may be dynamic to serve the traffic demands, while avoiding interference between the carriers of an interference group.

Of course, depending upon the particular interference conditions experienced and the communication quality levels tolerable by particular systems, ones of the carriers of an interference group may be adjusted other than lockstep, if desired. For example, operation of the present invention may allow overlapping a particular communication link of one carrier, or the remainder of the grouped carriers, by ones of the carriers of the interference group (i.e., forward link of carrier A may overlap reverse link of carrier B) while not allowing overlap in the other direction (i.e., reverse link of carrier A may not overlap forward link of carrier B).

According to the preferred embodiment of the present invention, a traffic scheduler or traffic schedulers are utilized to monitor the instantaneous traffic demands of the carrier channels of an interference group to thereby determine the appropriate amount of asymmetry at which to operate the carrier channels of the interference group. Accordingly, with respect to the carrier channels of the interference group, instead of controlling the asymmetry for a single carrier channel or even for a single hub site, asymmetry is preferably controlled for a group of carrier channels that have the potential to interfere with each other.

Although it is recognized that in some scenarios the full advantages of the data throughput gain achievable using dynamic asymmetry may not be realized when all carriers are not independently operated, data throughput gain is nonetheless realized over a fixed TDD system in most cases. In fact, computer simulations of lockstep adjustment of interference group carrier channels indicate that significant multiplexing gain is achieved.

Figure 8A:
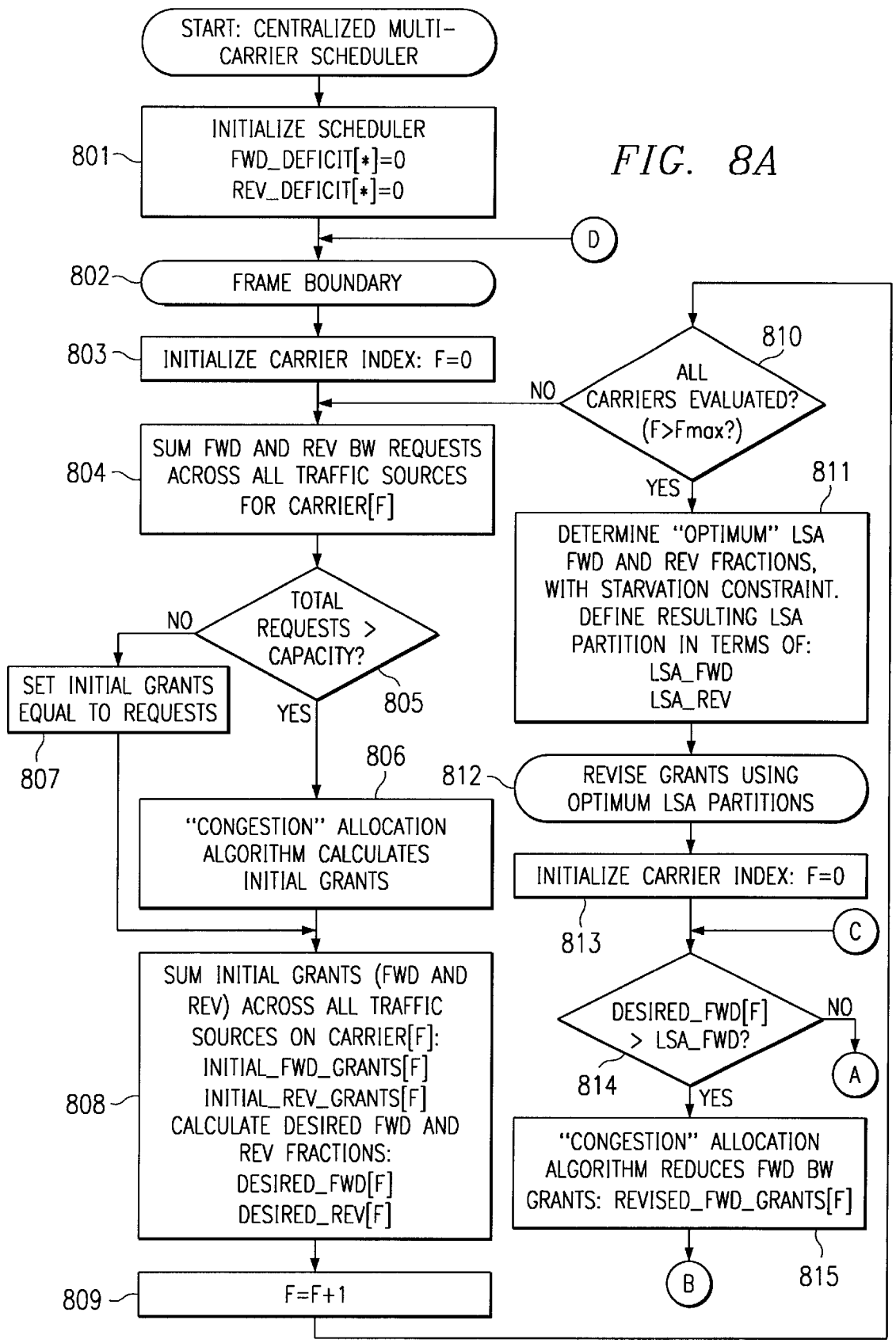
FIGS. 8A and 8B illustrate a flow diagram of a preferred embodiment of the present invention operable to provide multiple carrier lockstep asymmetric adaptive time division duplexing.
Figure 8B:
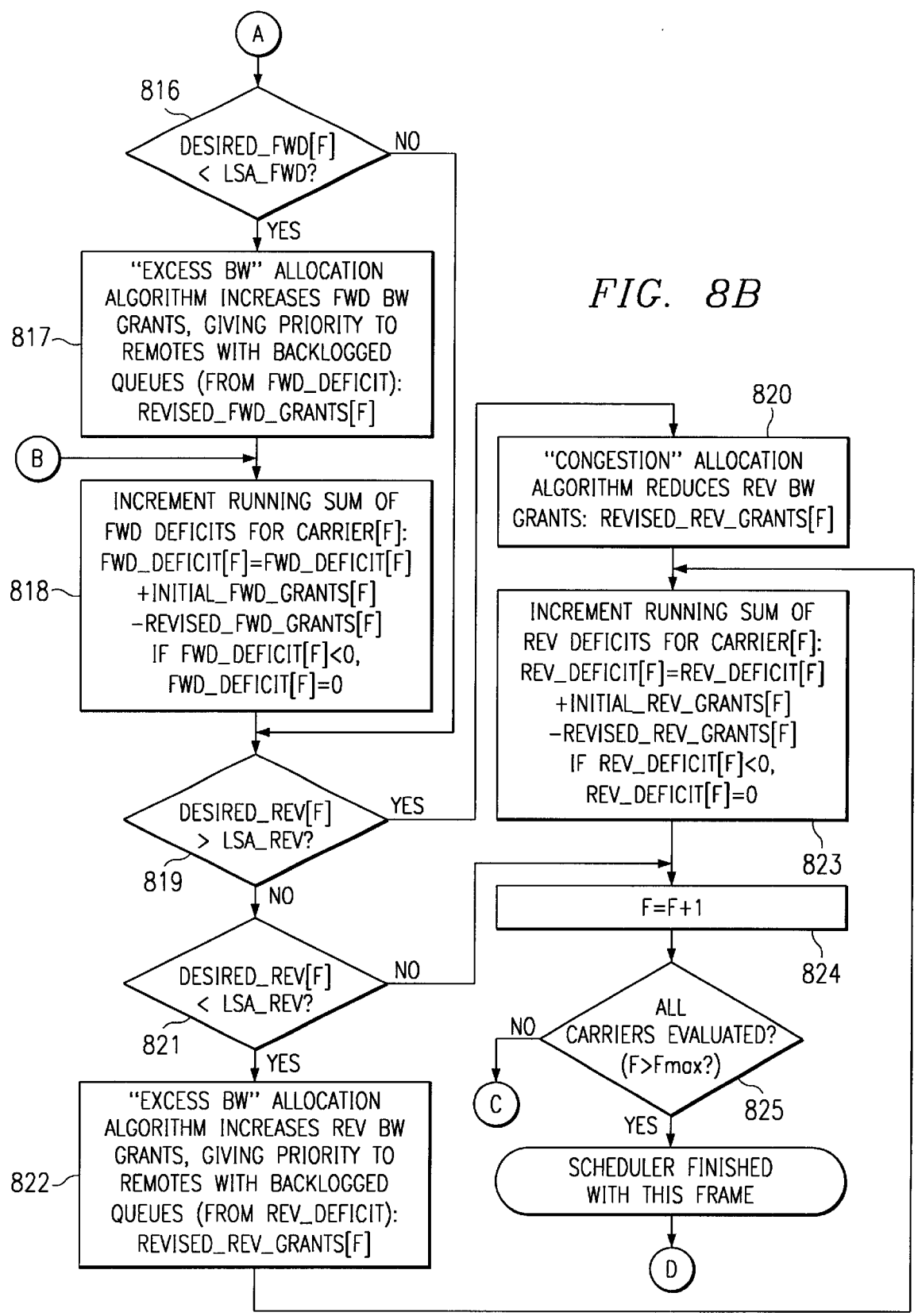

Operation of a preferred embodiment traffic scheduler providing lockstep asynchronous (LSA) ATDD is shown in the flow diagram of FIGS. 8A and 8B. As described in detail below, the preferred embodiment traffic scheduler preferably identifies nodes or traffic sources of the interference group, preferably including information with respect to various system resources or system resource configurations for which interference is expected, in order to ensure corresponding adjustments in resource utilization are made where necessary. The preferred embodiment traffic scheduler is provided communication information associated with the identified nodes or traffic sources, such as traffic demands/requests. Having the communication information and the interference grouping information, the traffic scheduler will have information with respect to asymmetry configurations which require corresponding lockstep adjustment, the traffic demands/requests of particular nodes (instantaneous and/or historical), the quality of service desired/required at particular nodes, and the like. Accordingly, the traffic scheduler is able to intelligently make determinations and compromises with respect to the adjustment of the forward and reverse links in order to accommodate traffic demands/requests.

Reference is now made to FIGS. 8A and 8B for a description of the operation of a preferred embodiment traffic scheduler of multiple carriers. The preferred embodiment of FIGS. 8A and 8B begins at step 801 wherein a traffic scheduler of the present invention is initialized. Preferably the traffic scheduler is initialized much as discussed with respect to step 701 above. However, as the embodiment of FIGS. 8A and 8B is adapted for operation with multiple carriers, it is envisioned that additional traffic scheduler initialization information may utilized, such as the above described information regarding interference groupings. Additionally, the above described information may be supplemented, such as by indexing information by the frequency (F) to which it is associated. Moreover, the traffic scheduler of FIGS. 8A and 8B may be provided with additional information, such as running sums of deficiencies for forward and reverse traffic for each carrier. For example, the variables FWD_DEFICIT and REV_DEFICIT are preferably initialized and zeroed to provide a non-negative value representing the running sum of forward direction and reverse direction, respectively, deficits for each remote (R) caused by operation of bandwidth assignment according to the present invention.

At step 802 a frame boundary for which a determination of allocation of ATDD resources is identified. As with the preferred embodiment of FIG. 7, a new schedule is preferably created once per frame in response to bandwidth demand on the links or requests issued by the various traffic sources. Of course, alternative embodiments, such as those described above may also be used.

At step 803 the beginning of an analysis loop through multiple carriers is established. Accordingly the preferred embodiment initializes a carrier index (F=0). The carrier index preferably is utilized in identifying and incrementing a select group of carriers to be analyzed and/or resource adjusted according to the present invention. This group of carriers might include all carriers at a particular hub or even all carriers utilized within the communication system or any portion thereof. Alternatively, the group of carriers may be a subset of the carriers available, such as only those carriers of an interference group or those carriers for which ATDD is allowed where a portion of the carriers utilize fixed TDD frames.

At step 804, the traffic scheduler accumulates and analyzes bandwidth demands placed on the links and/or bandwidth requests issued by the various traffic sources of a particular carrier (F) to determine traffic exigencies with respect to that carrier. Accordingly, the preferred embodiment of FIGS. 8A and 8B sums the forward and reverse traffic demands/requests across all traffic sources on the particular carrier.

At step 805 a determination is made as to whether the instantaneous traffic exigencies exceed link capacity for a particular carrier (F). If the instantaneous traffic exigencies are not within the link capacity for that carrier, then processing proceeds to step 806.

At step 806 a congestion allocation algorithm is preferably instigated. The congestion allocation algorithm of step 806 allocates available bandwidth among the traffic sources to fairly share the bandwidth there between. Accordingly, allocation of available bandwidth by the congestion allocation algorithm of step 806 is substantially as described above with respect to step 705 of FIG. 7.

If at step 805 the instantaneous traffic exigencies are within the link capacity for a particular carrier (F), then processing proceeds to step 807. At step 807 all demands/requests are initially granted, i.e., noted as allocated although no actual operation according to this assignment is yet instigated, by logically allocating burst periods and/or adjusting burst period durations to accommodate each traffic source's forward link demands/requests and each traffic source's reverse link demands/requests. Preferably, the initial grant of demands/requests is effected as described above with respect to step 706 of FIG. 7 described above, although no actual implementation of the assignments are effectuated.

The above described steps of the multiple carrier traffic scheduler calculate initial bandwidth grants based on demands/requests and other algorithmic rules for each carrier (F) independently. Accordingly, it should be appreciated that initial allocation of bandwidth on a particular carrier as described with respect to steps 804–808 is substantially as discussed above with respect to the single carrier traffic scheduler of FIG. 7, except that there is no attempt to allocate any excess bandwidth. This initial grant of the desired forward and reverse frame fractions for each carrier are preferably further optimized in the steps described below with respect to a preferred embodiment LSA algorithm. Excess bandwidth on each carrier, as identified from the initial allocation of bandwidth accomplished in the steps above, if any, will preferably be affected by the allocation compromises accomplished in the LSA algorithm steps below.

At step 808, as instigated from either of step 806 or step 807, the preferred embodiment operates to accumulate and analyze initial grants of bandwidth for each carrier (F). Preferably, the forward and reverse initial grants are summed to determine the desired forward and reverse frame fractions of the TDD frame. As step 808 is performed in a loop for each carrier (F), this information is preferably stored for each such carrier to be utilized in providing compromises between allocation of resources so as to optimize the use of the spectrum according to the LSA algorithm.

For example, one carrier on an interference group might be fully loaded in this frame, such as with a desired forward fraction of 90% and a desired reverse fraction of 10%, while another carrier of the interference group might be only partially loaded, such as with a desired forward fraction of 40% and a desired reverse fraction of 15%. Accordingly, the operation of the preferred embodiment LSA algorithm described below may adjust initial allocations determined above to compromise the allocations to these carriers resulting in a "deficit" of desired capacity to one or more of these carriers when adjusted in lockstep fashion. In contrast, one carrier on an interference group might be fully loaded in this frame, such as with a desired forward fraction of 90% and a desired reverse fraction of 10%, while another carrier of the interference group might be only partially loaded, such as with a desired forward fraction of 40% and a desired reverse fraction of 5%. The operation of the preferred embodiment LSA algorithm described below may leave the initial allocations unaltered as no compromise of the allocations of these carriers may be desired because a lockstep adjustment for each carrier to a forward/reverse ratio of 90%/10% fully satisfies the demands/requests of both carriers.

At step 809 the carrier index is preferably incremented to facilitate operation of the above described steps for a plurality of carriers operable in the system. At step 810 a determination is made as to whether all carriers to be evaluated have been evaluated. If all carriers to be evaluated have not been evaluated then processing preferably returns to step 804 wherein analysis of the traffic demands/requests of a next carrier are accumulated/analyzed. However, if all carriers to be evaluated have been evaluated, the loop is ended and processing proceeds to step 811.

At step 811 the preferred embodiment determines an optimum assignment of forward and reverse fractions of the carriers, utilizing assignment compromises where necessary according to lockstep asymmetry constraints. For example, a LSA algorithm of the present invention may analyze the initial assignments of resources determined above, identifies carriers and/or resources of the initial assignments for which implementation of the initial assignments would result in undesired operation, e.g., high interference levels, and determine optimum lockstep adjustment of particular ones of the carriers and/or resources so as to maximize the total amount of traffic carried across all carriers.

Lockstep adjustment of asymmetry may be accomplished utilizing a number of considerations in order to "optimize" the asymmetry. According to one embodiment, a weighted selection technique is utilized. For example, if there are seven remotes on one carrier and one remote on the other, the selection of the particular lockstep adjustment to be implemented may be weighted in terms of the instantaneous traffic demand for each of the carriers. Additionally or alternatively, factors other than instantaneous demand may be utilized in adjusting asymmetry. For example, historical information may be utilized in the determination, such as to predict traffic demands prior to actual instantaneous demands/requests.

Preferably a starvation constraint is utilized in determining the optimum fractional partitions to mitigate or prevent a particular carrier or resource from dominating the determinations. For example, a running sum of the forward and/or reverse bandwidth deficits for each carrier, i.e., the amount of desired/requested bandwidth less the implemented amount of bandwidth updated in the previous frame because of the LSA allocations, may be utilized by the LSA algorithm to be used in making compromises with respect to assignments. In a preferred embodiment, the deficit information is used to select an optimized LSA fractional partition assignment favoring the carrier with the largest deficit. Of course, the deficit information may be used in a similar fashion for the carrier having the next largest deficit etcetera. Additionally or alternatively, threshold values, such as a predetermined threshold maximum deficit amount or a percentage of the carrier's deficit to carried information, may be utilized to determine favoritism in assigning resources according to the present invention.

After determining optimized resource assignments according to the present invention, processing preferably proceeds to steps adapted to revise the initial allocations of resources according to the optimized assignments (the beginning of which is identified as step 812). Accordingly, at step 813 a second multiple carrier loop is preferably instigated. The preferred embodiment again initializes a carrier index (F=0).

At step 814 a determination as to whether the desired forward bandwidth is greater than the forward bandwidth allocated according to the present invention is made for the particular carrier. For each carrier, if the desired forward fraction of the frame exceeds the LSA allocated forward partition, then the initial forward bandwidth grants are revised and reduced. Accordingly, if the desired bandwidth is greater than the allocated bandwidth processing preferably proceeds to step 815 wherein a congestion allocation algorithm reduces forward bandwidth grants.

If the desired forward fraction of the frame is less than the LSA allocated forward partition, then there is excess forward capacity to be distributed. If neither case is true, all initial forward bandwidth grants stand. Accordingly, if the desired bandwidth is not greater than the allocated bandwidth processing preferably proceeds to step 816. At step 816 a determination is made as to whether the desired forward bandwidth is less than the forward bandwidth allocated according to the present invention for the particular carrier.

If the desired bandwidth is less than the allocated bandwidth, processing proceeds to step 817. At step 817 an excess bandwidth allocation algorithm, such as that described above with respect to step 708, is preferably implemented to increase forward bandwidth grants. Preferably, the excess bandwidth grants give priority to certain data, such as queue backlogs. Of course, the additional bandwidth may be utilized for other communications, as described above, in addition to or rather than to increase the bandwidth grants.

At step 818, as instigated from either of step 815 or step 817, the preferred embodiment operates to keep a running sum of forward deficits, for each carrier, for use by the preferred embodiment LSA algorithm described above. In the preferred embodiment only positive deficits, occurrences of demand exceeding allocations, are recorded. Of course in alternative embodiments negative deficits, allocations exceeding demands may be recorded to provide a more complete picture of optimization according to the present invention.

After maintenance of running sums of forward deficits, the preferred embodiment of the present invention shown in FIGS. 8A and 8B proceeds to step 819. Likewise, if the desired bandwidth is determined not to be less than the allocated bandwidth at step 816, then the initial bandwidth allocations stand and processing proceeds to step 819.

At step 819 a determination as to whether the desired reverse bandwidth is greater than the reverse bandwidth allocated according to the present invention is preferably made for the particular carrier. For each carrier, if the desired reverse fraction of the frame exceeds the LSA allocated reverse partition, then the initial reverse bandwidth grants are revised and reduced. Accordingly, if the desired bandwidth is greater than the allocated bandwidth processing preferably proceeds to step 820 wherein a congestion allocation algorithm reduces reverse bandwidth grants.

If the desired reverse fraction of the frame is less than the LSA allocated reverse partition, then there is excess reverse capacity to be distributed. If neither case is true, all initial reverse bandwidth grants stand. Accordingly, if the desired bandwidth is not greater than the allocated bandwidth processing preferably proceeds to step 821. At step 821 a determination is made as to whether the desired reverse bandwidth is less than the reverse bandwidth allocated according to the present invention for the particular carrier.

If the desired bandwidth is less than the allocated bandwidth, processing proceeds to step 822. At step 822 an excess bandwidth allocation algorithm, such as that described above with respect to step 708, is preferably implemented to increase reverse bandwidth grants. Preferably, the excess bandwidth grants give priority to certain data, such as queue backlogs.

At step 823, as instigated from either of step 820 or step 822, the preferred embodiment operates to keep a running sum of reverse deficits, for each carrier, for use by the preferred embodiment LSA algorithm described above. In the preferred embodiment only positive deficits, occurrences of demand exceeding allocations, are recorded. Of course in alternative embodiments negative deficits, allocations exceeding demands may be recorded to provide a more complete picture of optimization according to the present invention.

After maintenance of running sums of reverse deficits, the preferred embodiment of the present invention shown in FIGS. 8A and 8B proceeds to step 824. Likewise, if the desired bandwidth is determined not to be less than the allocated bandwidth at step 821, then the initial bandwidth allocations stand and processing proceeds to step 824.

At step 824 the carrier index is preferably incremented to facilitate operation of the above described steps for a plurality of carriers operable in the system. At step 825 a determination is made as to whether all carriers to be evaluated have been evaluated. If all carriers to be evaluated have not been evaluated then processing preferably returns to step 814 wherein revision of the initial grants are revised for a next carrier using optimum LSA partitions determined according to the present invention. However, if all carriers to be evaluated have been evaluated, this preferred embodiment has completed operation with respect to the selected frame and processing is preferably returned to step 802 where a next frame is selected.

It shall be appreciated that the preferred embodiment described above with reference to FIGS. 8A and 8B is adapted to provide lockstep asymmetry allocation of resources in addition to the adaptive time division duplexing described above with respect to the single carrier operation of FIG. 7. A most preferred embodiment of the present invention, however, is not only adapted to utilize ATDD with multiple carriers, but is also adapted to utilize frequency agile systems, such as adaptation of particular nodes to alter carrier channels as desired. Frequency agility according to a preferred embodiment allows a frequency agile system not only to adjust transmit and/or receive frequencies, but allows a frequency agile system to transmit on one frequency and receive on another in any given frame. Of course, alternative embodiments of the present invention may be utilized, such as where transmit and receive frequency are adjusted in lockstep, if desired.

Figure 9A:
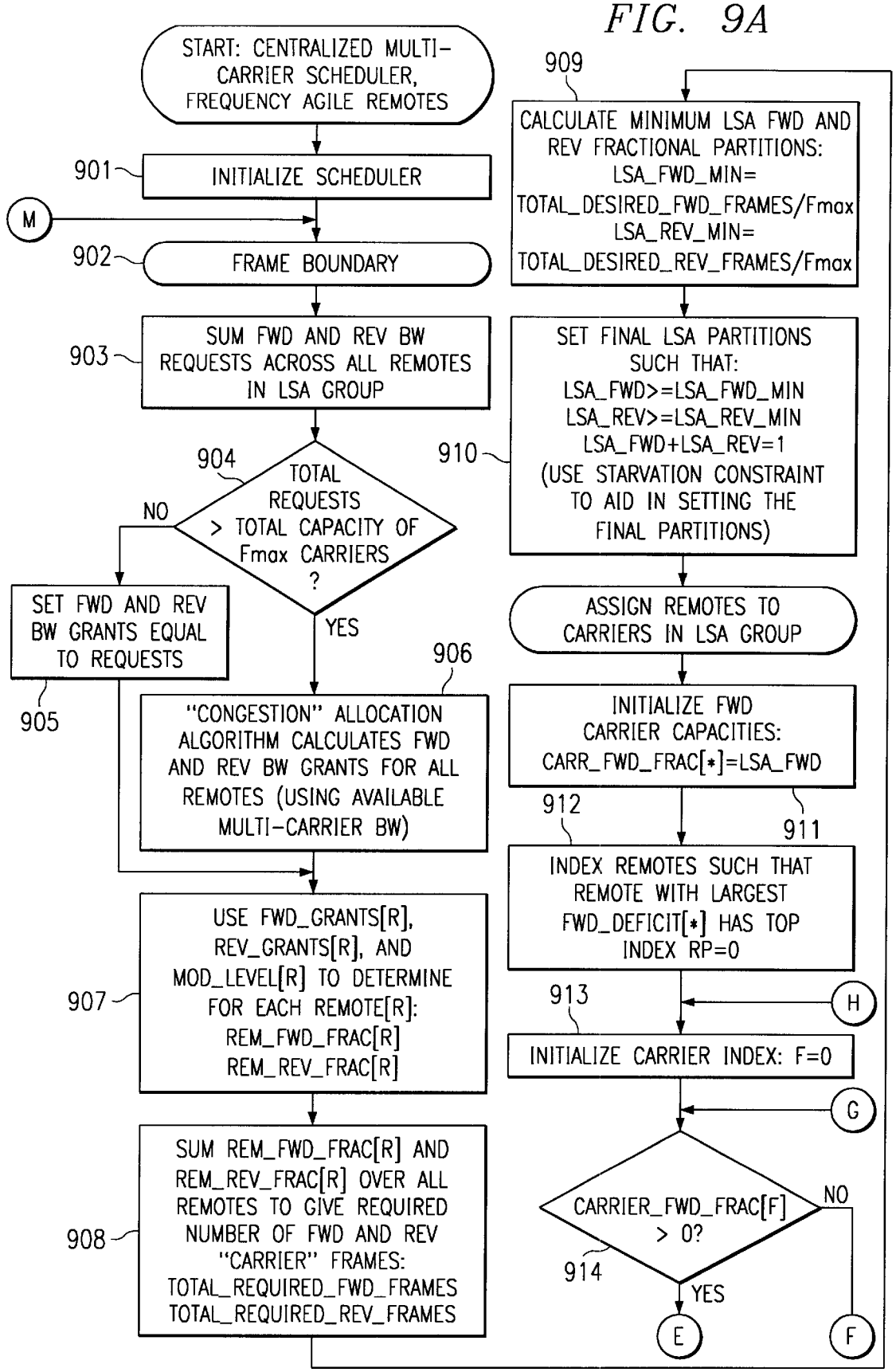
FIGS. 9A through 9C illustrate a flow diagram of a preferred embodiment of the present invention operable to provide multiple carrier lockstep asymmetric adaptive time division duplexing with frequency agile traffic sources.
Figure 9B:
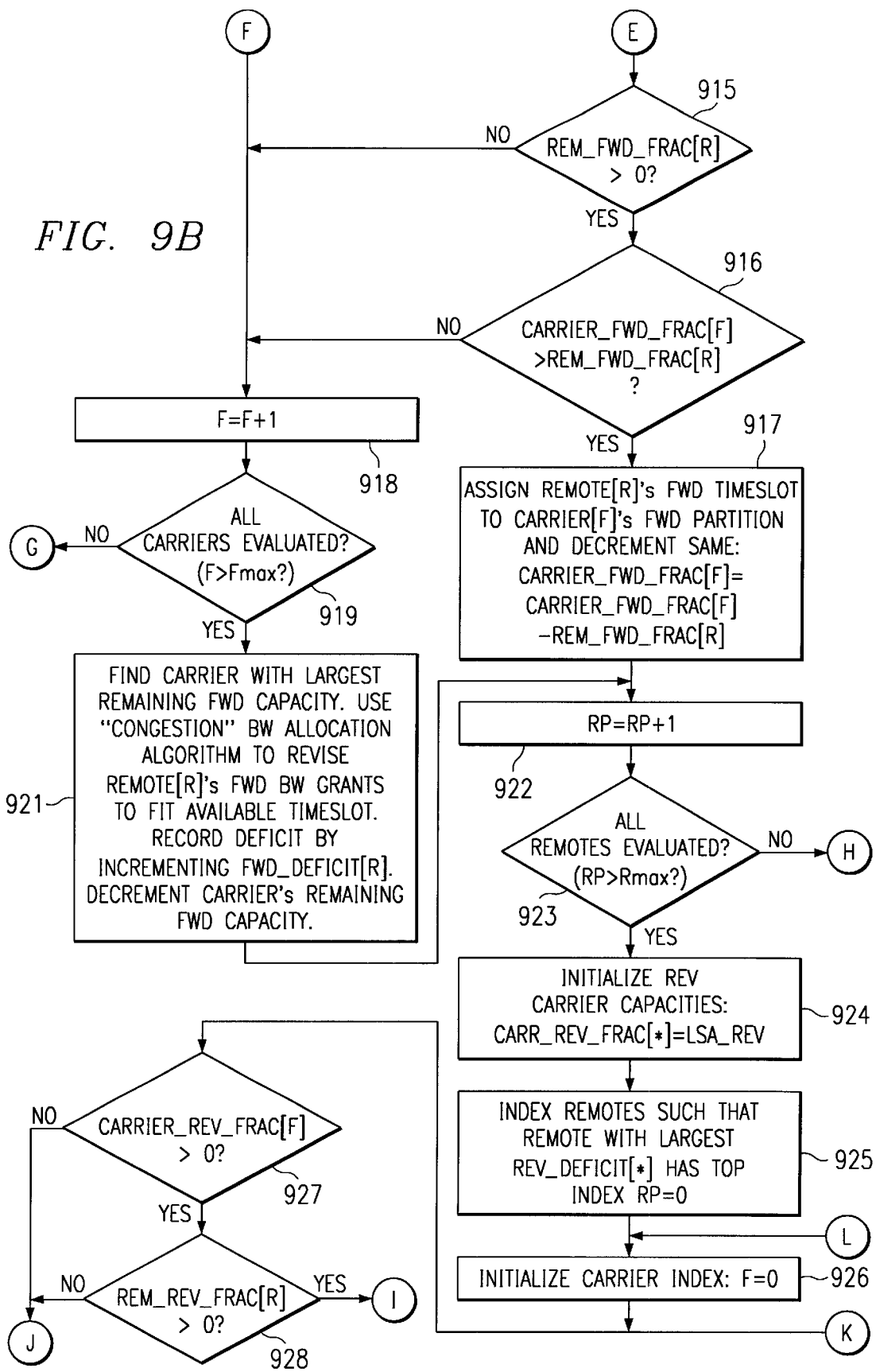
Figure 9C:
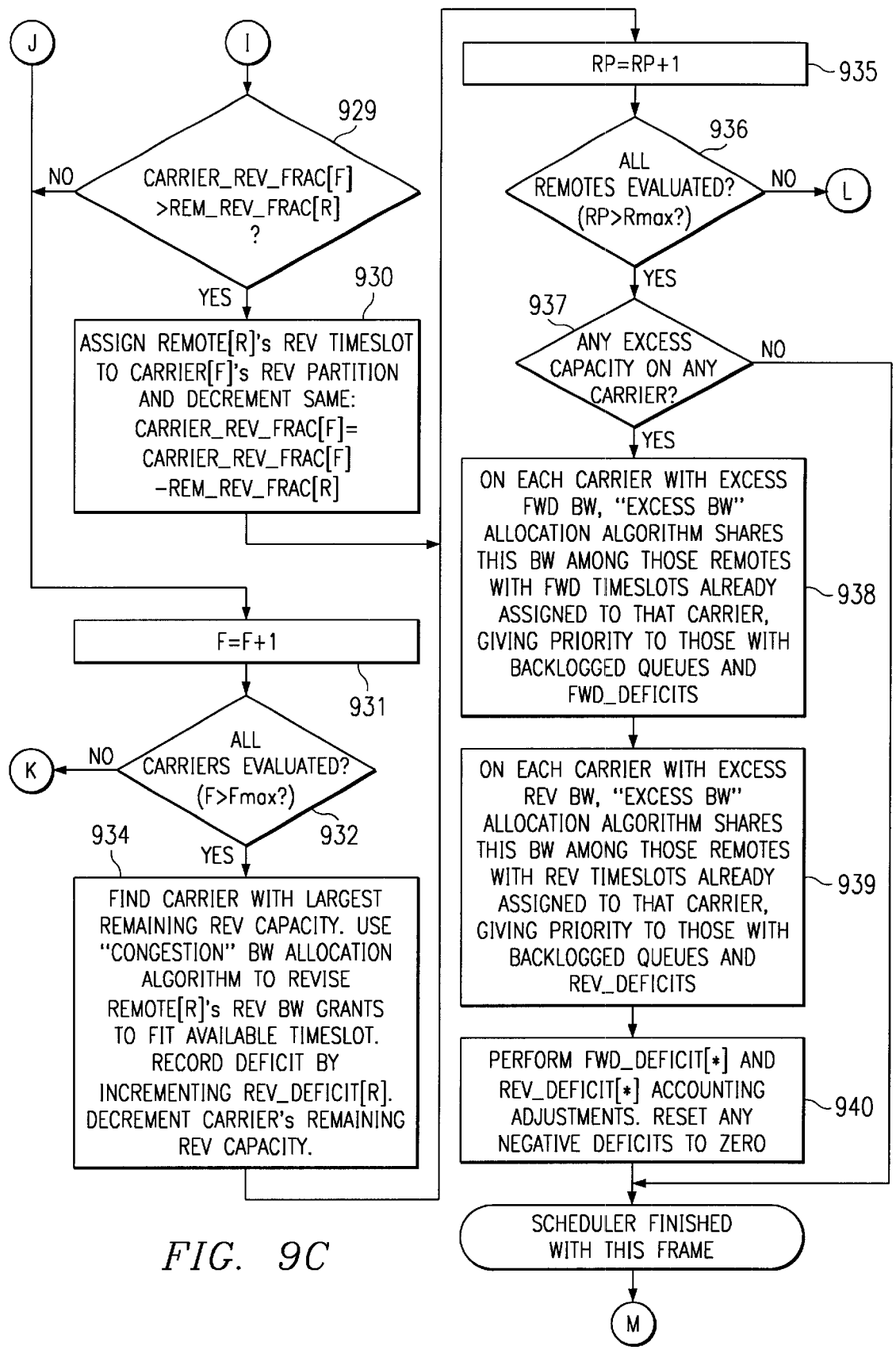

Directing attention to FIGS. 9A through 9C, a preferred embodiment flow diagram of a traffic scheduler adapted to accommodate frequency agile remotes is shown. At step 901, according to this preferred embodiment, the traffic scheduler is initialized substantially as described above with respect to step 701 of FIG. 7 and/or step 801 of FIG. 8A. However, initialization may further include information with respect to particular equipment, such as remotes and/or hub antenna assemblies, which are frequency agile. This information may additionally or alternatively include particular frequencies for which agility is provided.

At step 902 a frame boundary for which a determination of allocation of ATDD resources is identified. As with the preferred embodiment of FIG. 7, a new schedule is preferably created once per frame in response to bandwidth demand on the links or requests issued by the various traffic sources. Of course, alternative embodiments, such as those described above may also be used.

At step 903, the traffic scheduler accumulates and analyzes bandwidth demands placed on the links and/or bandwidth requests issued by the various traffic sources of an interference group to determine traffic exigencies with respect to that interference group. Accordingly, the preferred embodiment of FIGS. 9A through 9C sums the forward and reverse traffic demands/requests across all traffic sources in the interference group.

Since systems utilized according to the preferred embodiment of FIGS. 9A through 9C are frequency agile, and can therefore preferably access any carriers of the interference group, the total bandwidth demands/requests of all traffic sources can be compared directly to the total capacity of all carriers in the interference group. Accordingly, at step 904 a determination is made as to whether the instantaneous traffic exigencies exceed link capacity for the carriers available and/or utilized by the interference group ($F_{max}$).

If the instantaneous traffic exigencies are not within the total link capacity for the interference group carriers, then processing proceeds to step 906. At step 906 a congestion allocation algorithm is preferably instigated. The congestion allocation algorithm of step 906 preferably calculates the forward and reverse bandwidth grants for all traffic sources using available multiple carrier bandwidth. Accordingly, step 906 preferably allocates available bandwidth among the traffic sources to fairly share the bandwidth there between. Preferably, allocation of available bandwidth by the congestion allocation algorithm of step 906 is substantially as described above with respect to step 705 of FIG. 7.

If at step 904 the instantaneous traffic exigencies are within the link capacity for the interference group carriers ($F_{max}$), then processing proceeds to step 905. At step 905 all demands/requests are initially granted, i.e., noted as allocated although no actual operation according to this assignment is yet instigated, by logically allocating burst periods and/or adjusting burst period durations to accommodate each traffic source's forward link demands/requests and each traffic source's reverse link demands/requests. Preferably, the initial grant of demands/requests is effected as described above with respect to step 706 of FIG. 7 and/or step 807 of FIG. 8A, although no actual implementation of the assignments are effectuated.

The above described steps of the multiple carrier traffic scheduler calculate initial bandwidth grants based on demands/requests for the interference group carriers ($F_{max}$) without consideration for how these demands/requests are to be distributed among the carriers. Accordingly, the preferred embodiment operates to further determine allocation of the carriers to implement the demands/requests.

At step 907, as instigated from either of step 906 or step 905, the preferred embodiment operates to analyze initial grants of bandwidth for each traffic source to calculate the forward timeslot length and/or number of timeslots needed to carry the traffic source's traffic. This analysis is also preferably repeated for the reverse timeslot length and/or number of timeslots.

At step 908 the preferred embodiment of FIGS. 9A through 9C sums all forward timeslots for all traffic sources. Likewise, the reverse timeslots for all traffic sources are also preferably summed. These sums yield the total number of forward and reverse carrier frames required to carry all the allocated traffic. Step 909 operates to calculate the minimum forward and reverse frame fractional partitions to accommodate the allocated traffic and step 910 operates to set the partitions to implement the allocations.

For example, using an example of 12 remote stations and 3 carriers in an interference group, assume that each remote desires 0.125 forward timeslots and 0.10 reverse timeslots. The total desired forward frames is 1.5 while the total desired reverse frames is 1.2. From the above information the minimum desired forward and reverse LSA partitions may be calculated. For example, averaging the total forward and reverse desires across all 3 carriers provides minimum forward partitions for each carrier of 0.5 (LSA_FWD_MIN=1.5/3=0.5) and minimum reverse partitions for each carrier of 0.4 (LSA_REV_MIN=1.2/3−0.4). It should be appreciated that, as this example is utilizing 3 carriers for which one frame boundary is being allocated, the sum of the forward and reverse frames allocated above should not exceed 3 frames. Moreover, since the final LSA partitions preferably add up to 1.0, assuming that there are no significant forward or reverse deficits from previous frames, an equal amount of pad may be added to each minimum partition described above. Accordingly, forward partitions for each carrier may be set to 0.55 and reverse partitions for each carrier may be set to 0.45 (1−(0.5+0.4)=0.1 and 0.1/2=0.05 to be added to each partition). Of course, operation according to the present invention may allocate resources differently, such as where previous frame deficits are present. For example, if one or more traffic source had a significant reverse deficit from previous frames, the use of a starvation constraint as described above could cause the LSA algorithm to favor the reverse direction in distributing resources.

Accordingly, in the above example, at step 910 the final LSA partitions are set such that the total required forward or reverse capacity, plus some pad, is supplied by the 3 carriers. Thereafter, according to the preferred embodiment, the traffic sources are assigned to carriers of the interference group.

At step 911 the forward carrier capacities are preferably initialized to correspond to the LSA capacities determined above. At step 912 the traffic sources are preferably indexed to favor particular traffic sources in the actual allocation of resources. For example, the preferred embodiment of FIGS.

9A through 9C indexes traffic sources such that a traffic source with a largest forward deficit is provided the top index (RP=0).

At step 913 the beginning of an analysis loop through multiple carriers is established. Accordingly the preferred embodiment initializes a carrier index (F=0). Initialization of the carrier index is preferably substantially as described above with respect to step 803 of FIG. 8A.

At step 914 it is determined if the forward partition of a particular carrier is greater than 0. If the forward partition for this carrier is not greater than 0 there is no need to assign traffic sources to timeslots therein and, accordingly, processing proceeds to step 918.

However, if the forward partition for this carrier is greater than 0, then at step 915 it is determined if the forward fraction of the highest unprocessed traffic source (RP) is not greater than 0. If the forward fraction for this traffic source is not greater than 0 there is no need to assign carrier resources as all allocated capacity has been assigned and, accordingly, processing proceeds to step 918.

If the forward fraction of the highest unprocessed traffic source is greater than 0, then at step 916 a determination is made as to whether the forward partition of the particular carrier is greater than the forward fraction for this traffic source. If the forward portion of the particular carrier is determined to be greater than the forward fraction of the highest unprocessed traffic source at step 916, the preferred embodiment of the present invention proceeds to step 917 and thereafter continues to step 922. At step 917 the highest unprocessed traffic source is assigned forward timeslots of the particular carrier.

If, however, the forward portion of the particular carrier is not greater than the forward fraction of the highest unprocessed traffic source the preferred embodiment proceeds to step 918 as the carrier's available capacity cannot accommodate the traffic source's traffic. It should be appreciated that, according to this preferred embodiment, the total required forward timeslot for a given remote in a given frame is not split among multiple carriers, there is a timeslot granularity that may at times preclude some of the traffic sources from sending their desired timeslot length. Accordingly, alternative embodiments may utilize techniques other than the above described simple average for determining LSA partitions to be utilized according to the present invention. Moreover, it should be appreciated that alternative embodiments of the present invention may be operated to assign a portion of the allocated capacity for one traffic source to multiple carriers, if desired.

At step 918, as instigated from any of step 914, step 915, or step 916, the carrier index is preferably incremented to facilitate operation of the above described steps for a plurality of carriers operable in the system. At step 919 a determination is made as to whether all carriers to be evaluated have been evaluated. If all carriers to be evaluated have not been evaluated then processing preferably returns to step 914 wherein a next carrier is analyzed for assignment of resources to the traffic sources. However, if all carriers to be evaluated have been evaluated, the loop is ended and processing preferably proceeds to step 921.

At step 921 processing preferably proceeds to invoke a congestion bandwidth allocation algorithm to assign forward timeslots to the remote. Preferably, processing at step 921 of the preferred embodiment also records any forward deficit for the remote for use in subsequent determinations of bandwidth allocation.

At step 922, as instigated from either step 917 or 921, the traffic source index is preferably incremented to facilitate operation of the above described steps for a plurality of traffic sources operable in the system. At step 923 a determination is made as to whether all traffic sources to be evaluated have been evaluated. If all traffic sources to be evaluated have not been evaluated then processing preferably returns to step 913 wherein the carrier index is again initialized. However, if all traffic sources to be evaluated have been evaluated, the loop is ended and processing preferably proceeds to step 924.

At step 924 the reverse carrier capacities are preferably initialized to correspond to the LSA capacities determined above. At step 925 the traffic sources are preferably indexed to favor particular traffic sources in the actual allocation of resources. For example, the preferred embodiment of FIGS. 9A through 9C indexes traffic sources such that a traffic source with a largest reverse deficit is provided the top index (RP=0).

At step 926 the beginning of an analysis loop through multiple carriers is established. Accordingly the preferred embodiment initializes a carrier index (F=0). Initialization of the carrier index is preferably substantially as described above with respect to step 803 of FIG. 8A.

At step 927 it is determined if the reverse partition of a particular carrier is greater than 0. If the reverse partition for this carrier is not greater than 0 there is no need to assign traffic sources to timeslots therein and, accordingly, processing proceeds to step 931.

However, if the reverse partition for this carrier is greater than 0, then at step 928 it is determined if the reverse fraction of the highest unprocessed traffic source (RP) is not greater than 0. If the reverse fraction for this traffic source is not greater than 0 there is no need to assign carrier resources as all allocated capacity has been assigned and, accordingly, processing proceeds to step 931.

If the reverse fraction of the highest unprocessed traffic source is greater than 0, then at step 929 a determination is made as to whether the reverse partition of the particular carrier is greater than the reverse fraction for this traffic source. If the reverse portion of the particular carrier is determined to be greater than the reverse fraction of the highest unprocessed traffic source at step 929, the preferred embodiment of the present invention proceeds to step 930 and thereafter to step 935. At step 930 the highest unprocessed traffic source is assigned reverse timeslots of the particular carrier.

If, however, the reverse portion of the particular carrier is not greater than the reverse fraction of the highest unprocessed traffic source the preferred embodiment proceeds to step 931 as the carrier's available capacity cannot accommodate the traffic source's traffic. It should be appreciated that, according to this preferred embodiment, the total required reverse timeslot for a given remote in a given frame is not split among multiple carriers, there is a timeslot granularity that may at times preclude some of the traffic sources from sending their desired timeslot length. Accordingly, alternative embodiments may utilize techniques other than the above described simple average for determining LSA partitions to be utilized according to the present invention. Moreover, it should be appreciated that alternative embodiments of the present invention may be operated to assign a portion of the allocated capacity for one traffic source to multiple carriers, if desired.

At step 931, as instigated from any of step 927, step 928, or step 929, the carrier index is preferably incremented to facilitate operation of the above described steps for a plurality of carriers operable in the system. At step 932 a determination is made as to whether all carriers to be evaluated have been evaluated. If all carriers to be evaluated have not been evaluated then processing preferably returns to step 927 wherein a next carrier is analyzed for assignment of resources to the traffic sources. However, if all carriers to be evaluated have been evaluated, the loop is ended and processing preferably proceeds to step 934.

At step 934 processing preferably proceeds to invoke a congestion bandwidth allocation algorithm to assign reverse timeslots. Preferably, processing at step 934 of the preferred embodiment also records reverse deficit for the remote for use in subsequent determinations of bandwidth allocation.

At step 935, as instigated from either step 932 or 934, the traffic source index is preferably incremented to facilitate operation of the above described steps for a plurality of traffic sources operable in the system. At step 936 a determination is made as to whether all traffic sources to be evaluated have been evaluated. If all traffic sources to be evaluated have not been evaluated then processing preferably returns to step 926 wherein the carrier index is again initialized. However, if all traffic sources to be evaluated have been evaluated, the loop is ended and processing preferably proceeds to step 937.

At step 937, the preferred embodiment operates to determine if any excess capacity remains on any carrier of the interference group after the assignment of resources according to the present invention. If no excess capacity remains, processing preferably returns to step 902 where a next frame is selected.

However, if excess capacity remains, processing preferably proceeds to steps 938 and 939 for the allocation of forward and reverse excess capacity. Preferably the allocation of excess bandwidth is substantially as described above with respect to step 708 to increase forward and/or reverse bandwidth grants. Preferably, the excess bandwidth grants give priority to certain data, such as queue backlogs. Of course, the additional bandwidth may be utilized for other communications, as described above, in addition to or rather than to increase the bandwidth grants.

At step 940 the preferred embodiment adjusts a running sum of forward and/or reverse deficits, for each remote, for use by the preferred embodiment LSA algorithm described above. Preferably, the maintenance of the forward and/or reverse deficits at step 940 is substantially as described above with respect to steps 818 and/or 823 of FIG. 8B described above. After maintenance of running sums of reverse deficits, the preferred embodiment of the present invention shown in FIGS. 9A through 9C processing is preferably returned to step 902 where a next frame is selected.

Although the preferred embodiment of FIGS. 8A and 8B and 9A through 9C have been described above with respect to lockstep adjustment of adaptive time division duplexing, it should be appreciated that independent adjustment of adaptive time division duplexing is also possible according to the present invention. For example, traffic schedules as described above operate independently for multiple interface groups to thereby provide asymmetric time division frames for ones of the interference groups. Although described above with reference to a preferred embodiment wireless communication system, it should be appreciated that the present invention may be utilized to provide adaptive time division duplexing in a number of media. For example, the present invention may be utilized with wavelength division multiplexing or dense wavelength division multiplexing operable in a fibre optic media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A time division duplex, fixed frame with dynamically variable data density, point-to-multipoint communications system with at least one hub each having at least one modem and plural directional antennas and a plurality of nodes each having a highly directional antenna comprising a traffic scheduler operable to dynamically establish a forward link fraction and a reverse link fraction of at least one carrier, wherein said traffic scheduler comprises:

a traffic determination system; and an allocation system operable to dynamically establish a forward link fraction and a reverse link fraction based on information from said traffic determination system and to allocate said forward link fraction and said reverse link fraction to traffic sources according to a predetermined set of operational procedures.

2. The traffic scheduler of claim 1, wherein said allocation system comprises:

a traffic congestion portion operable according to said predetermined set of operational procedures to distribute a capacity deficit among ones of said traffic sources if information provided by said traffic determination system indicates traffic in excess of an available capacity provided at least in part by said at least one carrier.

3. The traffic scheduler of claim 2, wherein the predetermined set of operational procedures provide substantially equal distribution of said capacity deficit among ones of said traffic sources.

4. The traffic scheduler of claim 2, wherein the predetermined set of operational procedures provide a weighted distribution of said capacity deficit among ones of said traffic sources.

5. The traffic scheduler of claim 4, wherein said weighted distribution is based at least in part on a transmission priority associated with a particular traffic source.

6. The traffic scheduler of claim 4, wherein said weighted distribution is based at least in part on a minimum bandwidth guarantee associated with a particular traffic source.

7. The traffic scheduler of claim 4, wherein said weighted distribution is based at least in part on historical deficit information with respect to a particular traffic source.

8. The traffic scheduler of claim 1, wherein said allocation system comprises:

an excess bandwidth portion operable according to said predetermined set of operational procedures to distribute a capacity excess among ones of said traffic sources if information provided by said traffic determination system indicates a surplus of available capacity provided at least in part by said at least one carrier.

9. The traffic scheduler of claim 8, wherein the predetermined set of operational procedures provide substantially equal capacity excess among ones of said traffic sources.

10. The traffic scheduler of claim 8, wherein the predetermined set of operational procedures provide weighted distribution of capacity excess among ones of said traffic sources.

11. The traffic scheduler of claim 10, wherein said weighted distribution is based at least n part on a transmission priority associated with a particular traffic source.

12. The traffic scheduler of claim 10, wherein said weighted distribution is based at least in part on a minimum bandwidth guarantee associated with a particular traffic source.

13. The traffic scheduler of claim 1, wherein said allocation system comprises:
   a carrier assignment system operable to dynamically assign carriers to said traffic sources.

14. The traffic scheduler of claim 13, wherein assignment of said carriers is performed in combination with said allocation of said forward link fraction and said reverse link fraction to said traffic sources to optimize utilization communication capacity.

15. The traffic scheduler of claim 10, wherein said weighted distribution is based at least in part on historical deficiency information with respect to a particular traffic source.

16. The traffic scheduler of claim 1, wherein said traffic determination system utilizes information regarding current traffic demands/requests in determining traffic.

17. The traffic scheduler of claim 1, wherein said traffic determination system utilizes historical traffic information.

18. The traffic scheduler of claim 1, wherein said traffic determination system operates to determine instantaneous traffic utilization.

19. The traffic scheduler of claim 1, wherein said at least one carrier comprises a plurality of carriers.

20. The traffic scheduler of claim 19, wherein operation of said allocation system establishes a forward link fraction and a reverse link fraction of a first carrier of said plurality of carriers different than a forward link fraction and a reverse link fraction of a second carrier of said plurality of carriers.

21. A traffic scheduler operable to dynamically establish a forward link fraction and a reverse link fraction of at least one carrier, wherein said traffic scheduler comprises:
   a traffic determination system; and
   an allocation system operable to dynamically establish a forward link fraction and a reverse link fraction based on information from said traffic determination system and to allocate said forward link fraction and said reverse link fraction to traffic sources according to a predetermined set of operational procedures,
   wherein said at least one carrier comprises a plurality of carriers,
   wherein operation of said allocation system establishes a forward link fraction and a reverse link fraction of a first carrier of said plurality of carriers different than a forward link fraction and a reverse link fraction of a second carrier of said plurality of carriers,
   wherein said first carrier is a carrier of an interference group, and
   wherein said interference group includes a plurality of carriers which are operated with a same forward link fraction and a seam reverse link fraction.

22. A time division duplex, fixed frame with dynamically variable data density, point-to-multipoint communications system with at least one hub each having at least one modem and plural directional antennas and a plurality of nodes each having a highly directional antenna comprising:
   a plurality of carriers, and
   a traffic scheduler operable to dynamically establish a directional link channel fraction of communication capacity for carriers of said plurality of carriers, wherein said traffic scheduler comprises:
      an allocation system operable to allocate said directional link channel fraction to traffic sources according to a predetermined set of operational procedures, wherein a directional link channel fraction of a first carrier of said plurality of carriers is different than a corresponding directional link channel fraction of a second carrier of said plurality of carriers.

23. The communication system of claim 22, wherein said traffic scheduler further comprises:
   a carrier assignment system operable to dynamically assign traffic sources to carriers of said plurality of carriers according to said predetermined set of operational procedures.

24. The communication system of claim 23, wherein said carrier assignment system and said allocation system operating according to said predetermined set of operational procedures minimize an amount of capacity deficit experienced by said communication system.

25. A communication system for providing adaptive time division duplexing, said communication system comprising:
   a plurality of carriers, and
   a traffic scheduler operable to dynamically establish a directional link channel fraction of communication capacity for carriers of said plurality of carriers, wherein said traffic scheduler comprises:
      an allocation system operable to allocate said directional link channel fraction to traffic sources according to a predetermined set of operational procedures, wherein a directional link channel fraction of a first carrier of said plurality of carriers is different than a corresponding directional link channel fraction of a second carrier of said plurality of carriers,
      wherein said plurality of carriers includes a first group of carriers determined to cause undesired interference when operated in at least one configuration.

26. The communication system of claim 25, wherein said at least one configuration includes carriers of said first group simultaneously operating with a same communication interface.

27. The communication system of claim 26, wherein said same communication interface is an antenna element.

28. The communication system of claim 25, wherein said at least one configuration includes a carrier of said first group operating in a forward link simultaneously with another carrier of said first group operating in a reverse link.

29. The communication system of claim 25, wherein said first group comprises said first carrier and not said second carrier.

30. The communication system of claim 22, wherein said allocation system comprises:
   a congestion system operable to determine a capacity deficit, wherein said allocation operates to allocate said directional link channel fraction responsive to said capacity deficit.

31. The communication system of claim 30, wherein said allocation of said directional link channel fraction responsive to said capacity deficit distributes said deficit substantially equally among ones of said traffic sources.

32. The communication system of claim 30, wherein said allocation of said directional link channel fraction responsive to said capacity deficit distributes said deficit substantially equally among ones of said carriers.

33. The communication system of claim 30, wherein said allocation of said directional link channel fraction responsive to said capacity deficit distributes said deficit differently among ones of said traffic sources.

34. The communication system of claim 33, wherein said distribution of said deficit is based at least in part on historical deficits associated with ones of said traffic sources.

35. The communication system of claim 33, wherein said distribution of said deficit is based at least in part on a priority of service associated with ones of said traffic sources.

36. The communication system of claim 33, wherein said distribution of said deficit is based at least in part on a guarantee of bandwidth associated with ones of said traffic sources.

37. The communication system of claim 33, wherein said distribution of said deficit is based at least in part on historical deficits associated with ones of said carriers.

38. The communication system of claim 22, wherein said allocation system comprises:
   an excess bandwidth system operable to determine a capacity surplus, wherein said allocation operates to allocate said directional link channel fraction responsive to said capacity surplus.

39. The communication system of claim 38, wherein said allocation of said directional link channel fraction responsive to said capacity surplus distributes said surplus substantially equally among ones of said traffic sources.

40. The communication system of claim 38, wherein said allocation of said directional link channel fraction responsive to said capacity surplus distributes said surplus substantially equally among ones of said carriers.

41. The communication system of claim 38, wherein said allocation of said directional link channel fraction responsive to said capacity surplus distributes said surplus differently among ones of said traffic sources.

42. The communication system of claim 41, wherein said distribution of said surplus is based at least in part on historical deficits associated with ones of said traffic sources.

43. The communication system of claim 41, wherein said distribution of said surplus is based at least in part on a priority of service associated with ones of said traffic sources.

44. The communication system of claim 41, wherein said distribution of said surplus is based at least in part on a guarantee of bandwidth associated with ones of said traffic sources.

45. The communication system of claim 41, wherein said distribution of said surplus is based at east in part on historical deficits associated with ones of said carriers.

46. The communication system of claim 22, wherein said directional link channel fraction is a forward link channel fraction.

47. The communication system of claim 22, wherein said directional link channel fraction is a reverse link channel fraction.

48. A communication system for providing adaptive time division duplexing, said communication system comprising:
   a plurality of carriers, and
   a traffic scheduler operable to dynamically establish a directional link channel fraction of communication capacity for carriers of said plurality of carriers, wherein said traffic scheduler comprises:
      an allocation system operable to allocate said directional link channel fraction to traffic sources according to a predetermined set of operational procedures, wherein a directional link channel fraction of a first carrier of said plurality of carriers is different than a corresponding directional link channel fraction of a second carrier of said plurality of carriers,
   wherein said plurality of carriers are microwave carriers.

49. The communication system of claim 48, wherein said microwave carriers are in the range of 10–60 GHz.

50. A method for providing communication capacity optimization in a time division duplex, fixed frame with dynamically variable data density, point-to-multipoint communications system with at least one hub each having at least one modem and plural directional antennas and a plurality of nodes each having a highly directional antenna, said method comprising the steps of:
   providing a plurality of carriers;
   determining a level of communication desired by traffic sources communicating via said plurality of carriers; and
   determining a portion of carrier capacity to be utilized in at least one of a forward and a reverse channel responsive to said determined level of communication desired by said traffic sources.

51. A method for providing communication capacity optimization, said method comprising the steps of:
   providing a plurality of carriers;
   determining a level of communication desired by traffic sources communicating via said plurality of carriers;
   determining a portion of carrier capacity to be utilized in at least one of a forward and a reverse channel responsive to said determined level of communication desired by said traffic sources; and
   identifying ones of said carriers as a lockstep group of carriers, wherein determination of a portion of said carrier capacity to be utilized in at least one of a forward and a reverse channel of each carrier of said lockstep group is the same.

52. The method of claim 51, wherein said step of identifying a lockstep group of carriers comprises the step of:
   determining ones of said plurality of carriers for which insufficient isolation is provided between other ones of said carriers to provide simultaneous utilization in a forward link of said ones of said plurality of carriers and a reverse link of said other ones of said carriers.

53. The method of claim 51, wherein said step of identifying a lockstep group of carriers comprises the step of:
   determining communication system resources for which a non-lockstep use configuration of ones of said plurality of carriers provide undesired results.

54. The method of claim 53, wherein said communication system resources comprise ones of said traffic sources.

55. The method of claim 53, wherein said communication system resources comprise antenna systems.

56. A method for providing communication capacity optimization, said method comprising the steps of:
   providing a plurality of carriers;
   determining a level of communication desired by traffic sources communicating via said plurality of carriers; and
   determining a portion of carrier capacity to be utilized in at least one of a forward and a reverse channel responsive to said determined level of communication desired by said traffic sources, wherein said step of determining a portion of carrier capacity to be utilized in at least one of a forward and a reverse channel provides a forward channel of a first carrier overlapping a reverse channel of a second carrier.

57. The method of claim 50, further comprising the step of:

determining a desired capacity deficit resulting from said determined portion of carrier capacity to be utilized in at least one of a forward and a reverse channel.

58. The method of claim 57, further comprising the step of:

allocating said capacity deficit substantially equally among ones of said traffic sources.

59. The method of claim 57, further comprising the step of:

allocating said capacity deficit according to historical deficit determinations.

60. The method of claim 57, further comprising the step of:

allocating said capacity deficit according to a priority of service.

61. The method of claim 57, further comprising the step of:

allocating said capacity deficit according to a desired quality of service.

62. The method of claim 50, further comprising the step of:

determining a capacity excess resulting from said determined portion of carrier capacity to be utilized in at least one of a forward and a reverse channel.

63. The method of claim 62, further comprising the step of:

allocating said capacity excess substantially equally among ones of said traffic sources.

64. The method of claim 62, further comprising the step of:

allocating said capacity excess according to a priority of service.

65. The method of claim 62, further comprising the step of:

allocating said capacity excess according to a desired quality of service.

66. A system for providing communication capacity optimization, said system comprising:

means for determining a level of communication desired by traffic sources communicating via a plurality of carriers;

means for determining a portion of carrier capacity to be utilized in at least one of a forward and a reverse channel responsive to said determined level of communication desired by said traffic sources; and means for identifying ones of said carriers as a first lockstep group of carriers, wherein determination of a portion of said carrier capacity to be utilized in at least one of a forward and a reverse channel of each carrier of said first lockstep group is the same.

67. The system of claim 66, further comprising:

means for identifying ones of said carriers as a second lockstep group of carriers, wherein determination of a portion of said carrier capacity to be utilized in at lest one of a forward and a reverse channel of each carrier of said second lockstep group is the same, and wherein said portion of said carrier capacity of said first group and said second group are different.

68. The system of claim 66, wherein said means for determining a portion of carrier capacity is operable every communication frame of a carrier.

69. The system of claim 66, wherein said means for determining a portion of carrier capacity is operable every superframe of a carrier, wherein said superframe is a predetermined plurality of communication frames of a carrier.

70. The system of claim 66, wherein said means for determining a portion of carrier capacity is operable upon the occurrence of an event.

71. The system of claim 70, wherein said event is a determination that a communication data queue has reached a predetermined threshold.

72. The system of claim 71, wherein said threshold is a queued amount of data.

73. The system of claim 71, wherein said threshold is an age of queued data.

74. The system of claim 70, wherein said event is a predetermined amount of time.

* * * * *